US012479095B2

(12) United States Patent
Higashi

(10) Patent No.: US 12,479,095 B2
(45) Date of Patent: Nov. 25, 2025

(54) CONTROL PLATFORM, CONTROL SYSTEM, SERVICE PROVIDING SYSTEM, SERVICE PROVIDING METHOD, AND CONTROL METHOD

(71) Applicant: HONDA MOTOR CO., LTD., Tokyo (JP)

(72) Inventor: Haruomi Higashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 577 days.

(21) Appl. No.: 17/637,222

(22) PCT Filed: Jul. 2, 2020

(86) PCT No.: PCT/JP2020/026040
§ 371 (c)(1),
(2) Date: Feb. 22, 2022

(87) PCT Pub. No.: WO2021/044720
PCT Pub. Date: Mar. 11, 2021

(65) Prior Publication Data
US 2022/0281106 A1 Sep. 8, 2022

(30) Foreign Application Priority Data

Sep. 2, 2019 (JP) .................. 2019-159338
Feb. 17, 2020 (JP) .................. 2020-024067
Apr. 6, 2020 (JP) .................. 2020-068187

(51) Int. Cl.
*B25J 9/16* (2006.01)
*G05D 1/00* (2006.01)

(52) U.S. Cl.
CPC ........... *B25J 9/1661* (2013.01); *B25J 9/1697* (2013.01); *G05D 1/0088* (2013.01)

(58) Field of Classification Search
CPC ..... B25J 9/1661; B25J 9/1697; G05D 1/0088; G05D 1/0297; G05B 2219/40264; H04Q 9/00
See application file for complete search history.

(56) References Cited

U.S. PATENT DOCUMENTS 7,162,534 B2 * 1/2007 Schleiss .................. G06Q 10/06
709/224
7,765,028 B2 * 7/2010 Orita ...................... G05D 1/027
700/264
(Continued)

FOREIGN PATENT DOCUMENTS

CN 102970193 A 3/2013
CN 105729491 A 7/2016
(Continued)

OTHER PUBLICATIONS

International Search Report dated Oct. 6, 2020, Application No. PCT/JP2020/026040, 4 pages.
(Continued)

*Primary Examiner* — Rachid Bendidi
*Assistant Examiner* — Nada Mahyoob Alqaderi
(74) *Attorney, Agent, or Firm* — Rankin, Hill & Clark LLP

(57) ABSTRACT

Provided is a control platform capable of controlling a plurality of effectors so as to suitably execute a first task configured by combining a plurality of predetermined operations. A CI brain module 51 of a control platform 5 recognizes a service (first task) through communication with a user terminal 8, recognizes a robot group for executing the service based on link data of a service generation module 52, recognizes the service as a plurality of jobs, and assigns (Continued)

these jobs to robots 2X to 2Z. Then, a communication module 50 transmits a command signal representing the job to the robots 2X to 2Z.

3 Claims, 27 Drawing Sheets

(56) References Cited

U.S. PATENT DOCUMENTS

| | | | |
|---|---|---|---|
| 10,065,317 B2 * | 9/2018 | Tan | B61G 5/08 |
| 2013/0321312 A1 * | 12/2013 | Higashi | G06F 3/041 |
| | | | 345/173 |
| 2015/0304416 A1 * | 10/2015 | Higashi | H04L 67/61 |
| | | | 709/217 |
| 2016/0129592 A1 | 5/2016 | Saboo et al. | |
| 2016/0196402 A1 * | 7/2016 | Higashi | G06F 3/14 |
| | | | 348/14.07 |
| 2016/0259329 A1 | 9/2016 | High et al. | |
| 2017/0242427 A9 * | 8/2017 | High | G06Q 30/0633 |
| 2018/0129995 A1 | 5/2018 | Fowler et al. | |
| 2018/0215037 A1 * | 8/2018 | High | G05D 1/692 |

FOREIGN PATENT DOCUMENTS

| | | | | |
|---|---|---|---|---|
| CN | 107111307 A | 8/2017 | | |
| CN | 108227654 A | 6/2018 | | |
| CN | 109676611 A | 4/2019 | | |
| CN | 109997162 A | 7/2019 | | |
| DE | 10230895 A1 | 3/2003 | | |
| JP | 2005-324278 | 11/2005 | | |
| JP | 2007-249801 | 9/2007 | | |
| JP | 2013-536095 | 9/2013 | | |
| JP | 5684911 | 3/2015 | | |
| KR | 10-2010-0073771 A | 7/2010 | | |
| WO | 2019/171917 | 9/2019 | | |
| WO | WO-2020129309 A1 * | 6/2020 | | B25J 11/0005 |

OTHER PUBLICATIONS

Chinese Office Action dated Jan. 9, 2024 issued in corresponding Chinese application No. 202080060172.1; English machine translation included (20 pages).

German Office Action issued in Corresponding German Application No. 112020004141.7, issued on Mar. 20, 2025, 12 pages.

\* cited by examiner

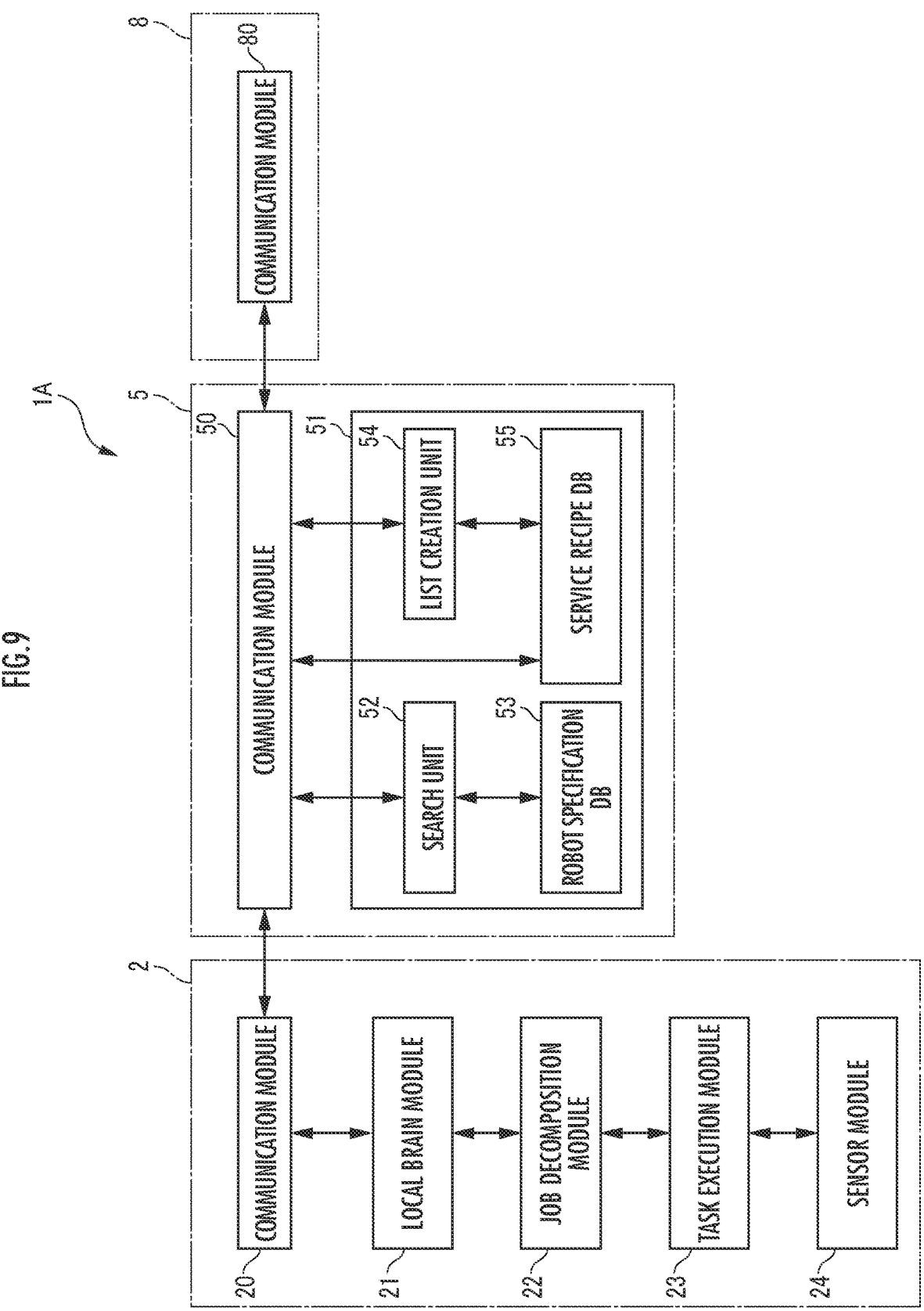

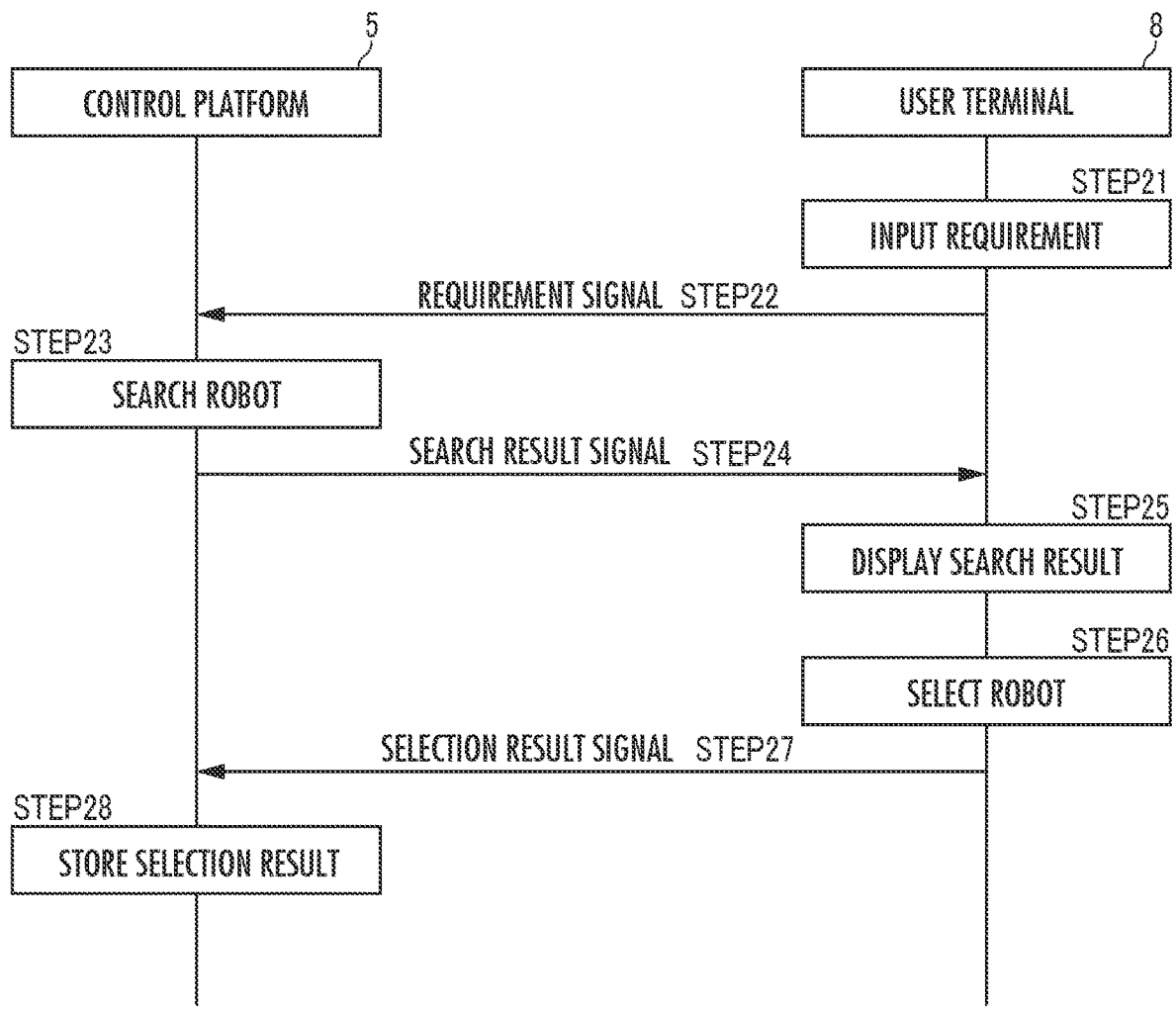

FIG. 11

| ROBOT 2I | INFRARED CAMERA | MANUFACTURER | HONDA MODULE |
| | | MODEL NUMBER | HT2SL-5.67 |
| | | TYPE | NEAR INFRARED CAMERA |
| | | SENSOR | T2SL |
| | | PIXEL | 320 × 256 |
| | | DETECTED WAVELENGTH | 1.0~2.5μm |
| | | COOLING | TE4 |
| | | MAXIMUM FRAME RATE | 100fps / 344fps |
| | | INTERFACE | USB |
| | METAL DETECTION SENSOR | MANUFACTURER | HONDA DETECTOR |
| | | MODEL NUMBER | HMS-1078 |
| | | CORRESPONDENCE | MAGNETIC SUBSTANCE, NONMAGNETIC SUBSTANCE |
| | ... | ... | ... |
| ROBOT 2E | THREE-FINGER GRIPPER | MANUFACTURER | HONDA GRIPPER |
| | | MODEL NUMBER | HGV3 |
| | | GRIPPER WEIGHT | 2.3kg |
| | | GRIPPER OPEN/CLOSE RANGE | 0-155mm |
| | | MAXIMUM RECOMMENDATION LOAD | 5kg |
| ... | ... | ... | ... |

FIG. 12

| ROBOT 2A | SPECIFICATION |
|---|---|
| RGB CAMERA | NO ZOOM |
| INFRARED CAMERA | PYROELECTRIC TYPE |

| ROBOT 2B | SPECIFICATION |
|---|---|
| ARM | LOAD BEARING 1 Kg |
| HAND | 3-25N |

| ROBOT 2C | SPECIFICATION |
|---|---|
| OPTICAL CAMERA | 20 TIMES ZOOM |
| HIGH-RESOLUTION CAMERA | 4K |

| ROBOT 2D | SPECIFICATION |
|---|---|
| ARM | LOAD BEARING 3 Kg |
| HAND | 5-30N |

| ROBOT 2E | SPECIFICATION |
|---|---|
| ARM | LOAD BEARING 5 Kg |
| HAND | 25-120N |

| ROBOT 2F | SPECIFICATION |
|---|---|
| METAL DETECTION SENSOR | ONLY MAGNETIC SUBSTANCE |
| INFRARED CAMERA | InGaAs |

| ROBOT 2G | SPECIFICATION |
|---|---|
| ARM | LOAD BEARING 5 Kg |
| HAND | 15-80N |

| ROBOT 2H | SPECIFICATION |
|---|---|
| OPTICAL CAMERA | 10 TIMES ZOOM |
| HIGH-RESOLUTION CAMERA | FHD |

| ROBOT 2I | SPECIFICATION |
|---|---|
| METAL DETECTION SENSOR | NONMAGNETIC SUBSTANCE |
| INFRARED CAMERA | T2SL |

| ROBOT 2J | SPECIFICATION |
|---|---|
| ARM | LOAD BEARING 3 Kg |
| HAND | 5-60N |

| ROBOT 2K | SPECIFICATION |
|---|---|
| OPTICAL CAMERA | 20 TIMES ZOOM |
| HIGH-RESOLUTION CAMERA | FHD |

| ROBOT 2L | SPECIFICATION |
|---|---|
| METAL DETECTION SENSOR | NONMAGNETIC SUBSTANCE |
| INFRARED CAMERA | PYROELECTRIC TYPE |

FIG.13

| SERVICE | ROBOT | NECESSARY SPECIFICATION | TAG |
|---|---|---|---|
| SECURITY SERVICE | ROBOT 2C | HIGH-RESOLUTION CAMERA (4K) | PATROLLING, SECURITY, PATROL, AIRPORT |
| | | TELEPHOTO CAMERA (20 TIMES OPTICAL ZOOM) | |
| | ROBOT 2E | SIX-DEGREE-OF-FREEDOM ARM (USEFUL LOAD 5 Kg) | OPEN LID OF TRASH CAN, SECURITY, INSPECTION SUPPORT, AIRPORT |
| | | THREE-FINGER HAND (GRIP FORCE 25-120 N) | |
| | ROBOT 2i | INFRARED CAMERA (T2SL) | INSPECT TRASH CAN, SECURITY, INSPECTION, AIRPORT |
| | | METAL DETECTION SENSOR (CORRESPONDING TO NONMAGNETIC SUBSTANCE) | |

FIG. 14

| SERVICE | ROBOT | NECESSARY SPECIFICATION | TAG |
|---|---|---|---|
| SECURITY SERVICE | ROBOT 2C | HIGH-RESOLUTION CAMERA (4K) | PATROLLING, SECURITY, PATROL, AIRPORT |
| | | TELEPHOTO CAMERA (20 TIMES OPTICAL ZOOM) | |
| | ROBOT 2E | SIX-DEGREE-OF-FREEDOM ARM (USEFUL LOAD 5 Kg) | OPEN LID OF TRASH CAN, SECURITY, INSPECTION SUPPORT, AIRPORT |
| | | THREE-FINGER HAND (GRIP FORCE 25-120 N) | |
| | ROBOT 2I | INFRARED CAMERA (T25L) | INSPECT TRASH CAN, SECURITY, INSPECTION, AIRPORT |
| | | METAL DETECTION SENSOR (CORRESPONDING TO NONMAGNETIC SUBSTANCE) | |
| RECEPTION SERVICE | ROBOT 2M | MICROPHONE (6 DIRECTIVITY) | RECEPTION, CASUAL |
| | | SPEAKER | |
| | ROBOT 2N | MICROPHONE (3 DIRECTIVITY) | RECEPTION, OFFICE, EXECUTIVE ROOM, POLITE RECEPTION |
| | | SPEAKER | |
| TRANSFER SERVICE | ROBOT 2O | LOAD BEARING 5 Kg | TRANSFER, FOOD AND DRINK, PET BOTTLE |
| | ROBOT 2P | LOAD BEARING 10 Kg | TRANSFER, MATERIAL |
| | ROBOT 2Q | LOAD BEARING 1 Kg | TRANSFER, STATIONARY |

FIG. 16

| ROBOT GROUP NO. | ROBOT | FUNCTIONAL SPECIFICATION | CHARACTERISTIC SPECIFICATION |
|---|---|---|---|
| 1 | ROBOT 2N | MICROPHONE (3 DIRECTIVITY) | RECEPTION SERVICE, RECEPTION, OFFICE, EXECUTIVE ROOM, POLITE RECEPTION |
| | | SPEAKER | |
| | ROBOT 2E | SIX-DEGREE-OF-FREEDOM ARM (USEFUL LOAD 5 Kg) | SECURITY SERVICE, OPEN LID OF TRASH CAN, SECURITY, INSPECTION SUPPORT, AIRPORT |
| | | THREE-FINGER HAND (GRIP FORCE 25-120 N) | |
| | ROBOT 2O | LOAD BEARING 5 Kg | TRANSFER SERVICE, TRANSFER, FOOD AND DRINK, PET BOTTLE |
| 2 | ROBOT 2N | MICROPHONE (3 DIRECTIVITY) | RECEPTION, OFFICE, EXECUTIVE ROOM, POLITE RECEPTION |
| | | SPEAKER | |
| | ROBOT 2E | SIX-DEGREE-OF-FREEDOM ARM (USEFUL LOAD 5 Kg) | SECURITY SERVICE, OPEN LID OF TRASH CAN, SECURITY, INSPECTION SUPPORT, AIRPORT |
| | | THREE-FINGER HAND (GRIP FORCE 25-120 N) | |
| | ROBOT 2P | LOAD BEARING 10 Kg | TRANSFER SERVICE, TRANSFER, MATERIAL |
| ... | ... | ... | ... |

FIG.23

| ROBOT ID | TIME STAMP | POSITION (x, y) | SPEED RANGE |
|---|---|---|---|
| 2R | 2020.0102.0930.30 | (2, 15) | MEDIUM SPEED |
| 2S | 2020.0102.0930.30 | (28, 15) | MEDIUM SPEED |
| 2R | 2020.0102.0930.31 | (8, 15) | LOW SPEED |
| 2S | 2020.0102.0930.31 | (22, 15) | MEDIUM SPEED |
| 2R | 2020.0102.0930.32 | (11, 13) | LOW SPEED |
| 2S | 2020.0102.0930.32 | (18, 15) | LOW SPEED |
| 2R | 2020.0102.0930.33 | (15, 11) | LOW SPEED |
| 2S | 2020.0102.0930.33 | (15, 18) | LOW SPEED |

FIG.27

| CALCULATION PERIOD | AREA ID | AREA CENTER (x, y) | AREA RADIUS | DEGREE OF CONGESTION CD |
|---|---|---|---|---|
| 0930.30~0930.33 | E | (13, 15) | 5 | 5 |
| 0930.30~0930.33 | F | (40, 45) | 10 | 7 |
| 0930.30~0930.33 | G | (70, 30) | 15 | 10 |
| 0930.30~0930.33 | H | (95, 50) | 5 | 4 |

CONTROL PLATFORM, CONTROL SYSTEM, SERVICE PROVIDING SYSTEM, SERVICE PROVIDING METHOD, AND CONTROL METHOD

TECHNICAL FIELD

The present invention relates to a control platform for controlling a plurality of effectors, and the like.

BACKGROUND ART

Conventionally, a control platform described in Patent Literature 1 is known. The control platform controls a robot as an effector, and includes a cloud computing platform capable of communicating with the robot. The control platform includes a plurality of brain modules corresponding to a plurality of robots and a plurality of social modules corresponding to a plurality of brain modules.

In this control platform, when operation information including data and a request from a robot is received, the brain module processes the operation information, transmits a processing result thereof to the robot, and transmits a control command to the corresponding robot in response to the request for the operation information. As a result, an action of the robot and the like are controlled according to these processing results and control commands. The social module performs communications between the plurality of brain modules, thereby controlling the plurality of robots.

Conventionally, a control platform described in Patent Literature 2 is known. This control platform is an information processing apparatus applied to a service providing system, and controls a robot as an effector in order to provide a service in a store. The service providing system includes, as the robots, a product conveyance robot, a cleaning robot, and the like.

In this service providing system, when the product conveyance robot finds contamination of the floor in the store during conveyance of the product, image information thereof is transmitted from the product conveyance robot to the information processing apparatus. Accordingly, the cleaning robot is controlled by the information processing apparatus to perform floor cleaning work.

In addition, conventionally, a control platform described in Patent Literature 3 is known. This control platform assists shopping by a shopper in a shopping facility, and includes a plurality of motorized transport units as movable items. The motorized transport unit is mounted on a shopping cart to automatically move the shopping cart.

In this control platform, when a destination is input by a smartphone of the shopper, a position of the corresponding motorized transport unit of the plurality of movable items is detected, and the motorized transport unit is controlled to move to the destination. At that time, if an obstacle is present in a movement path of the motorized transport unit, the motorized transport unit is stopped until the obstacle is clear, or the motorized transport unit is controlled to move in order to avoid the obstacle (paragraph [0080]).

CITATION LIST

Patent Literature

Patent Literature 1: JP 5684911 B2
Patent Literature 2: WO 2019/171917 A1
Patent Literature 3: US 2016/0259329 A

SUMMARY OF INVENTION

Technical Problem

When the plurality of robots have different abilities, that is, when the plurality of robots execute different predetermined operations, it is conceivable that a first task configured by combining a plurality of predetermined operations is executed by controlling the plurality of robots in combination. On the other hand, according to the control platform of Patent Literature 1, there is a problem that the plurality of robots cannot be controlled to suitably execute the first task because execution of such a first task is not considered. This problem similarly occurs when controlling the effector other than the robot, for example, a plurality of work machines.

On the other hand, according to the control platform and the service providing system of Patent Literature 2, although it is possible to provide simple services such as a product replenishment service and a floor cleaning service, there is a problem that it is not possible to provide a more advanced service, for example, a service executed by complicatedly combining a plurality of operations and functions. In order to provide such advanced services, for example when high functionality and high performance of the robot are intended, the manufacturing cost of the robot increases.

Depending on the type of service requested by a user, a robot with various types of performance may be required even for the same service. For example, in the case of the product replenishment service, when a heavy weight product is handled, a robot having a larger load bearing or a larger maximum load is required than when a light weight product is handled. On the other hand, according to the control platform and the service providing system of Patent Literature 2, the user cannot select the robot having the performance requested by the user, and as a result, there is a possibility that convenience of the user is deteriorated. The above problem occurs not only in the case of using the robot but also in the case of using an effector other than the robot.

In addition, according to the control platform of Patent Literature 3, when the movement of the plurality of motorized transport units to the destination is controlled, it takes time to reach the destination because a degree of congestion on the movement path is not considered. As a result, there is a decrease in merchantability such as an increase in dissatisfaction of shoppers. This problem may occur not only in the motorized transport unit but also in other movable items.

The present invention has been made to solve the above problems, and a first object thereof is to provide a control platform or the like capable of controlling a plurality of effectors so as to suitably execute a first task configured by combining a plurality of predetermined operations. In addition, a second object is to provide a control platform or the like that can achieve sophistication of a provided service and improvement of convenience while suppressing an increase in cost when a plurality of effectors are controlled to provide a service. In addition, a third object is to provide a control platform or the like that can suitably estimate the degree of congestion on the movement paths of a plurality of movable items and can improve merchantability.

Solution to Problem

In order to achieve the first object, the invention is a control platform in which at least one effector group including a plurality of effectors that execute different predetermined operations is communicably connected via a first communication network, and at least one user terminal operated by a user is communicably connected via a second communication network, and which is used for controlling the at least one effector group, the control platform including: a communication unit that executes communication between the at least one effector group and the at least one user terminal; a storage unit that stores link data in which the at least one effector group and a first task executable by the at least one effector group are linked; a first task recognition unit that recognizes the first task through communication with the user terminal, an effector group recognition unit that recognizes one effector group for executing the first task based on the communication with the user terminal and the link data of the storage unit; and a task assignment unit that recognizes the first task as a plurality of second tasks and assigns each of the plurality of second tasks to each of the plurality of effectors in one effector group recognized by the effector group recognition unit, in which the communication unit transmits a second task signal representing the second task assigned to each of the effectors by the task assignment unit to each of the effectors.

According to this control platform, the first task is recognized through the communication with the user terminal in the first task recognition unit, and one effector group for executing the first task is recognized in the effector group recognition unit based on the communication with the user terminal and the link data of the storage unit. In addition, in the task assignment unit, the first task is recognized as the plurality of second tasks, and each of the plurality of second tasks is assigned to each of the plurality of effectors in one effector group recognized by the effector group recognition unit. Then, in the communication unit, the second task signal representing the second task assigned to each of the effectors by the task assignment unit is transmitted to each of the effectors. Therefore, when the plurality of effectors in one effector group execute different predetermined operations, the plurality of effectors can be controlled so that the plurality of effectors suitably execute the first task.

A control system includes: the control platform; at least one effector group; and at least one user terminal, wherein the effector includes: an effector receiving unit that receives the second task signal; a third task recognition unit that recognizes the second task represented by the second task signal as a third task when the second task signal is received by the effector receiving unit; and an operation executing unit that executes the predetermined operation corresponding to the third task.

According to this control system, when the second task signal is received in the effector receiving unit of the effector, the second task represented by the second task signal is recognized as the third task in the third task recognition unit, and the predetermined operation corresponding to the third task is executed in the operation executing unit. As described above, each of the plurality of effectors executes the predetermined operation corresponding to the third task, whereby the second task and the first task are suitably executed. As a result, it is possible to realize the control system in which the effector suitably executes the first task.

The invention according to another aspect of the invention is the control system, wherein the third task recognition unit recognizes the second task as a plurality of the third tasks, and the operation executing unit executes a plurality of the predetermined operations corresponding to the plurality of third tasks.

According to this control system, the second task is recognized as the plurality of third tasks in the third task recognition unit, and the plurality of predetermined operations corresponding to the plurality of third tasks are executed in the operation executing unit, so that the plurality of third tasks can be executed by one effector. Thus, usefulness of the control system can be increased.

In order to achieve the second object described above, the invention is a control platform in which a plurality of effectors that execute different predetermined operations and a user terminal operated by a user are communicably connected and which controls the plurality of effectors in order to provide a service, the control platform including; a communication unit that executes communication between the plurality of effectors and the user terminal; a service data storage unit that stores service data defining a relationship between the plurality of effector groups and a service executable by the plurality of effector groups when a combination of the plurality of effectors is one effector group: a requesting service recognition unit that recognizes a requesting service that is a service requested by the user through communication with the user terminal; and a possible effector group determination unit that determines a combination of the plurality of effectors capable of executing the requesting service as a possible effector group based on the requesting service and the service data of the service data storage unit, wherein the communication unit transmits first data representing the possible effector group to the user terminal.

According to this control platform, in the requesting service recognition unit, the requesting service that is a service requested by the user is recognized through communication with the user terminal, and in the possible effector group determination unit, the combination of the plurality of effectors capable of executing the requesting service is determined as the possible effector group based on the requesting service and the service data of the service data storage unit. Then, since the first data representing the possible effector group is transmitted to the user terminal in the communication unit, the user can obtain information of the possible effector group capable of executing the requesting service via the user terminal, and the convenience of the user can be improved.

Since the service requested by the user can be provided by controlling the possible effector group that is a combination of the plurality of effectors, the performance and structure per effector can be simplified and the manufacturing cost can be reduced as compared with a conventional case where the service is provided by one effector. As a result, it is possible to realize sophistication of the provided service while suppressing an increase in cost.

A service providing system includes: the control platform; a plurality of effector groups; and a user terminal, wherein the user terminal includes: a terminal-side communication unit capable of receiving first data; an output interface that outputs a possible effector group represented by the first data in an output mode recognizable by a user when the terminal-side communication unit receives the first data: and an input interface capable of selecting one of the possible effector groups output from the output interface by an operation of the user.

According to this service providing system, in the output interface of the user terminal, when the terminal-side communication unit receives the first data, the possible effector group represented by the first data is output in the output mode recognizable by the user. In addition, since one of the possible effector groups output from the output interface is selectable by operation of the input interface by the user, the user can select, by operating the input interface, one effector group suitable for executing the service requested by the user from among the possible effector groups. Thus, the convenience of the user can be further improved.

According to another aspect of the invention, in the service providing system, service data includes data of a functional specification representing a function of each of the effectors in the plurality of effector groups and a characteristic specification representing a characteristic of each of the effectors, and the output interface outputs the possible effector group represented by the first data in an output mode including data of the functional specification and the characteristic specification of each of the possible effector groups.

According to this service providing system, since the output interface outputs the possible effector group represented by the first data in the output mode including data of the functional specification and the characteristic specification of each of the possible effector groups, the user can select, by operating the input interface, the effector group of the functional specification and the characteristic specification optimal for executing the service requested by the user from among the possible effector groups. Thus, the convenience of the user can be still further improved.

According to another aspect of the invention, in the service providing system, the terminal-side communication unit of the user terminal transmits, when one possible effector group is selected by the input interface, second data representing one possible effector group to the control platform, the control platform further includes a schedule determination unit that determines an operation schedule of each of the effectors in one possible effector group such that one possible effector group executes a service when the second data is received by the communication unit, the communication unit transmits an operation schedule signal representing the operation schedule to each of the effectors in one possible effector group, and each of the effectors includes an effector receiving unit that receives the operation schedule signal and an operation executing unit that executes a predetermined operation according to the operation schedule when the operation schedule signal is received by the effector receiving unit.

According to this service providing system, when one possible effector group is selected by the input interface, the terminal-side communication unit of the user terminal transmits the second data representing one possible effector group to the control platform. In addition, when the second data is received by the communication unit, the schedule determination unit of the control platform determines the operation schedule of each of the effectors in one possible effector group so that one possible effector group executes a service, and the communication unit transmits the operation schedule signal representing the operation schedule to each of the effectors in one possible effector group. Then, in each effector, when the operation schedule signal is received by the effector receiving unit, the operation executing unit executes a predetermined operation according to the operation schedule. As a result, the service selected by the user can be suitably provided to the user by execution of a predetermined operation of each effector in one possible effector group selected by the user.

In order to achieve the second object described above, the invention a service providing method in which when a service is requested by a user via a user terminal, any one of a plurality of effector groups is controlled via a control platform in which a plurality of effector groups and the user terminal are communicably connected in a case where a combination of a plurality of effectors that execute different predetermined operations is one effector group to provide a service, the service providing method including: storage step of storing, in the control platform, service data defining a relationship between each of the plurality of effector groups and any one of a plurality of services executable by each of the effector groups, determination step of determining, in the control platform, the combination of the plurality of effectors capable of executing the service by referring to the service data according to the service when the service is requested by the user, as a possible effector group; a first transmission step of transmitting first data representing the possible effector group from the control platform to the user terminal; a first reception step of receiving the first data at the user terminal; an output step of outputting the possible effector group represented by the first data to the user terminal in an output mode recognizable by the user when the first data is received; and a selection step of selecting one of the possible effector groups by an operation of the user terminal by the user.

According to a further aspect of the invention, in the service providing method, the service data includes data of a functional specification representing a function of each of the effectors in the plurality of effector groups and a characteristic specification representing a characteristic of each of the effectors, and in the output step, the possible effector group represented by the first data is output to the user terminal in an output mode including data of the functional specification and the characteristic specification of each of the possible effector groups.

According to another aspect of the invention, the service providing method further includes: a second transmission step of transmitting second data representing one possible effector group from the user terminal to the control platform when one possible effector group is selected by the operation of the user terminal; a second reception step of receiving the second data at the control platform; a determination step of determining, in the control platform, an operation schedule of each of the effectors in one possible effector group such that one possible effector group executes a service when the second data is received; a third transmission step of transmitting an operation schedule signal representing the operation schedule from the control platform to each of the effectors in one possible effector group; a third reception step of receiving the operation schedule signal at each of the effectors; and an operation execution step of executing a predetermined operation in each of the effectors according to the operation schedule when the operation schedule signal is received.

In order to achieve the third object described above, the invention is a control platform that executes wireless communication, via a wireless communication network, with each of a plurality of movable items that are autonomously movable and have a reduced moving speed when an obstacle is present in a moving direction and controls each of the movable items, the control platform including: a data acquisition unit that acquires, at a predetermined cycle, discrete data of the moving speed within a predetermined region of each of the movable items and discrete data of a position of a reference portion of each of the movable items when an outer shape of each of the movable items is simulatively defined as a graphic and projected on two-dimensional coordinates as moving speed data and position data, respectively; a storage unit that stores the moving speed data and the position data of each of the movable items; a low speed position data selection unit that selects, as low speed position data, the position data of each of the movable items in a predetermined low speed range when the moving speed data of each of the movable items stored in the storage unit is divided into a plurality of speed ranges including the predetermined low speed range; and a degree-of-congestion parameter calculation unit that calculates a degree-of-congestion parameter representing a degree of congestion on a movement path of each of the movable items according to the number of low speed position data of any of the plurality of movable items in which at least a portion of the outer shape is located in a closed curve region defined by a closed curve including an outer end of the outer shape of each of two movable items corresponding to two pieces of low speed position data most spaced apart from each other when the low speed position data within a predetermined period of the low speed position data of each of the movable items selected by the low speed position data selection unit is plotted on the two-dimensional coordinates.

According to this control platform, the data acquisition unit acquires the discrete data of the moving speed within the predetermined region of each of the movable items and the discrete data of the position of the reference portion of each of the movable items when the outer shape of each of the movable items is simulatively defined as a graphic and projected on the two-dimensional coordinates as the moving speed data and the position data, respectively, at the predetermined cycle, and the moving speed data and the position data of each of the movable items are stored in the storage unit. In addition, the low speed position data selection unit selects, as the low speed position data, the position data of each of the movable items in the predetermined low speed range when the moving speed data of each of the movable items stored in the storage unit is divided into the plurality of speed ranges including the predetermined low speed range.

Then, the degree-of-congestion parameter representing the degree of congestion on the movement path of each of the movable items is calculated according to the number of low speed position data of any of the plurality of movable items in which at least a portion of the outer shape is located in the closed curve region The closed curve region is a region defined by the closed curve including the outer end of the outer shape of each of the two movable items corresponding to the two pieces of low speed position data most spaced apart from each other when the low speed position data within a predetermined period of the low speed position data of each of the movable items selected by the low speed position data selection unit is plotted on the two-dimensional coordinates. Each of the movable items can be estimated to be in a congestion state in a case where the movable item moves in a low speed range because the movable item can move autonomously.

For the above reason, it can be estimated that the number of low speed position data of any of the plurality of movable items in which at least a portion of the outer shape is located in a two-dimensional figure accurately represents the degree of congestion on the movement path of each movable item around the two-dimensional figure within the predetermined period. Therefore, by calculating the degree-of-congestion parameter according to such a value, the degree-of-congestion parameter can be calculated as a value accurately representing the degree of congestion on the movement path of each movable item (the "obstacle" in the present specification is not limited to a stationary object, and includes a movable device, a human, an animal, and the like).

The invention is characterized in that, in the control platform, the closed curve region is a region defined by a two-dimensional figure whose maximum length is a length between two points where a straight line extending outward from the two pieces of low speed position data through the two pieces of low speed position data most spaced apart from each other intersects the outer shape of each of the movable items corresponding to the two pieces of low speed position data.

According to this control platform, the closed curve region is the region defined by the two-dimensional figure whose maximum length is the length between the two points where the straight line extending outward from the two pieces of low speed position data through the two pieces of low speed position data most spaced apart from each other intersects the outer shape of each of the movable items corresponding to the two pieces of low speed position data, so that the closed curve region can be easily created. This makes it possible to easily calculate the degree-of-congestion parameter.

The invention is characterized in that, in the control platform, the outer shape of the movable item is simulatively defined as a circle, the reference portion is set at a center point of the circle, and the two-dimensional figure is created as a circle whose maximum length is the diameter.

According to this control platform, the outer shape of the movable item is simulatively defined as a circle, the reference portion is set at the center point of the circle, and the two-dimensional figure is created as the circle whose maximum length is the diameter, therefore, the two-dimensional figure can be more easily created, and as a result, the maximum length can be more easily calculated.

The invention is characterized in that, in the control platform, the degree-of-congestion parameter calculation unit creates the closed curve region in one data set by regarding the low speed position data within a predetermined period of two or more movable items in which the closed curve regions overlap each other among the plurality of movable items as one data set.

According to this control platform, the low speed position data within the predetermined period of two or more movable items in which the closed curve regions overlap each other among the plurality of movable items is regarded as one data set, and the closed curve region in one data set is created; therefore, the degree-of-congestion parameter can be calculated as a value suitably representing the degree of congestion of the two or more movable items.

The invention is characterized by further including, in the control platform: a display data creation unit that creates display data in which the closed curve region is displayed so as to be superimposed on two-dimensional map data of the predetermined region; and a transmission unit that transmits a display data signal including the display data to an external device.

According to this control platform, the display data creation unit creates the display data in which the closed curve region is displayed so as to be superimposed on the two-dimensional map data of the predetermined region, and the transmission unit transmits the display data signal including the display data to the external device. Therefore, when the external device includes a display device, a user of the control platform can visually recognize the display data included in the display data signal on the display device.

The invention is characterized in that, in the control platform, the plurality of movable items include a plurality of effectors that cooperate with each other to provide a service.

According to this control platform, since the plurality of movable items include the plurality of effectors that cooperate with each other to provide a service, it is possible to determine the movement paths of the plurality of effectors while avoiding congestion, and thus, it is possible to smoothly execute provision of a service by the plurality of effectors without delay.

In order to achieve the third object described above, the invention is a control method of controlling each movable item by executing wireless communication, via a wireless communication network, with each of a plurality of the movable items that are autonomously movable and have a reduced moving speed when an obstacle is present in a moving direction, the control method including: a data acquisition step of acquiring, at a predetermined cycle, discrete data of the moving speed within a predetermined region of each of the movable items and discrete data of a position of a reference portion of each of the movable items when an outer shape of each of the movable items is simulatively defined as a graphic and projected on two-dimensional coordinates as moving speed data and position data, respectively; a storage step of storing the moving speed data and the position data of each of the movable items; a low speed position data selection step of selecting, as low speed position data, the position data of each of the movable items in a predetermined low speed range when the moving speed data of each of the movable items stored in the storage step is divided into a plurality of speed ranges including the predetermined low speed range; and a degree-of-congestion parameter calculation step of calculating a degree-of-congestion parameter representing a degree of congestion on a movement path of each of the movable items according to the number of low speed position data of any of the plurality of movable items in which at least a portion of the outer shape is located in a closed curve region defined by a closed curve including an outer end of the outer shape of each of two movable items corresponding to two pieces of low speed position data most spaced apart from each other when the low speed position data within a predetermined period of the low speed position data of each of the movable items selected in the low speed position data selection step is plotted on the two-dimensional coordinates.

BRIEF DESCRIPTION OF DRAWINGS

FIG. 9 is a block diagram illustrating functional configurations of the robot, the control platform, and a user terminal in the control system of the second embodiment.

FIG. 10 is a sequence diagram illustrating service recipe creation processing.

FIG. 11 is a diagram illustrating an example of a robot specification in a robot specification database.

FIG. 12 is a diagram illustrating an example of a search result of a robot that satisfies a requirement.

FIG. 13 is a diagram illustrating an example of a selection result of a robot group that executes a security service.

FIG. 14 is a diagram illustrating an example of a service recipe in the service recipe database.

FIG. 16 is a diagram illustrating an example of a list of the robot group.

FIG. 23 is a diagram illustrating an example of a result of acquiring movement states of two robots.

FIG. 27 is a diagram illustrating an example of a calculation result of degree-of-congestion data in the entire predetermined region.

DESCRIPTION OF EMBODIMENTS

Hereinafter, a control platform according to a first embodiment of the present invention will be described with reference to the drawings. The control platform of the present embodiment is applied to a control system 1 illustrated in FIG. 1.

Figure 1:
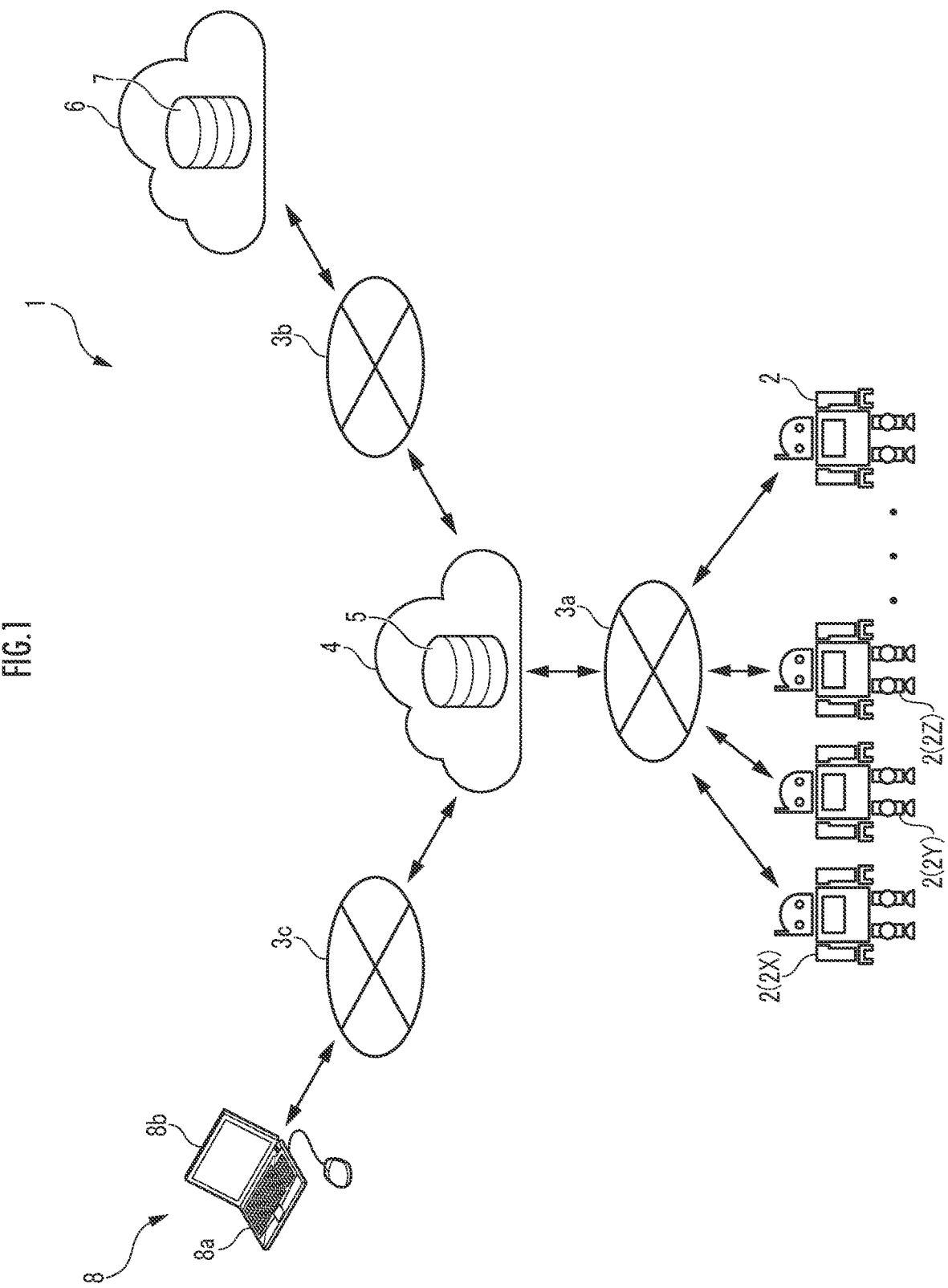
FIG. 1 is a diagram illustrating a configuration of a control platform and a control system including the control platform according to a first embodiment of the present invention.

The control system 1 is used for controlling a robot group including a plurality of robots 2 (only four are illustrated), and includes a control platform 5 as a control device, a client server 7, a plurality of user terminals 8 (only one is illustrated), and the like as illustrated in FIG. 1.

First, the robot 2 (effector) will be described. The robot 2 is of a customer service robot type that provides various services to guests in a predetermined service area (for example, a store).

In the present embodiment, the plurality of the robot groups are provided regarding the robot group including the plurality of robots 2 as one. Each of the plurality of robot groups is configured to execute a predetermined service by execution of different predetermined operations by the plurality of robots 2.

Figure 2:
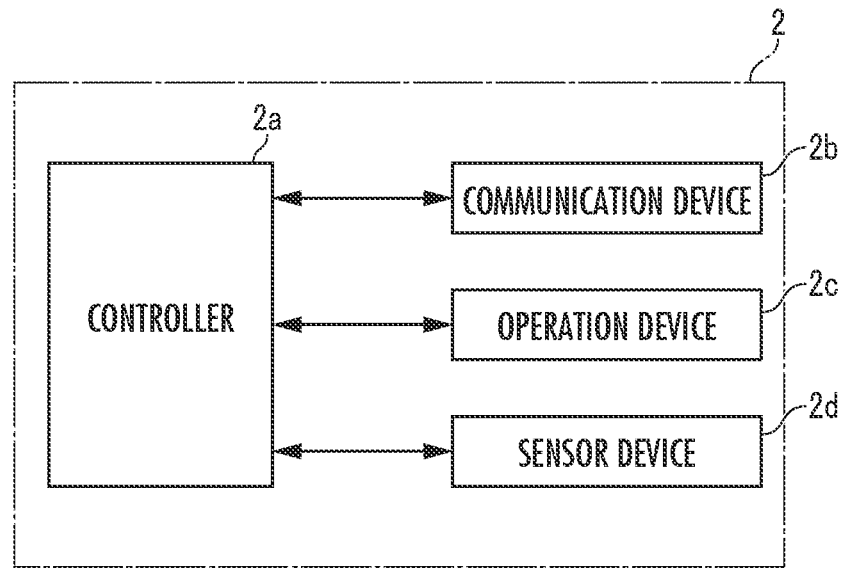
FIG. 2 is a block diagram illustrating a configuration of a robot.

As illustrated in FIG. 2, each of the robots 2 includes a controller 2a, a communication device 2b, an operation device 2c, a sensor device 2d, and the like. The controller 2a is used for controlling the communication device 2b and the operation device 2c, and includes a computer including a processor, a storage, an I/O interface (all not illustrated), and the like.

The communication device 2b is connected to the control platform 5 in cloud computing (hereinafter referred to as "cloud") 4 via a communication network 3a that is a wireless communication network, and is thereby configured to be capable of wireless communication with the control platform 5.

In the communication device 2b, one SIM card (not illustrated) that is contracted with a communication company is built in, and the SIM card is contracted with the communication company with one identification number. Thus, the communication device 2b executes wireless communication with the control platform 5 using this identification number as identification information.

The operation device 2c has a function for executing various operations described below, and the sensor device 2d detects operation environment information indicating an operation state of the operation device 2c and a peripheral environment state of the robot 2, and outputs a detection signal indicating the operation environment information to the controller 2a.

Although FIG. 1 illustrates humanoid robots as the plurality of robots 2, the plurality of robots 2 of the present embodiment have a simpler structure (not illustrated) than the humanoid robot, and include a robot of a type that executes a single predetermined operation and a robot of a type that executes a plurality of predetermined operations.

In the present embodiment, for example, a greeting robot 2X, a tea taking robot 2Y, a transfer robot 2Z, and other robots are provided as the plurality of robots 2. The greeting robot 2X includes a speaker (not illustrated) and the like as the operation device 2c, and includes a camera, a microphone, a GPS (all not illustrated) and the like as the sensor device 2d.

As will be described below, the greeting robot 2X executes order reception processing and arrival notification processing through communication with the control platform 5. In addition, the greeting robot 2X acquires its own position and the like by GPS.

In addition, the tea taking robot 2Y includes a robot arm, an actuator, a camera (all not illustrated), and the like as the operation device 2c. As will be described below, the tea taking robot 2Y executes tea taking processing through communication with the control platform 5.

In addition, the transfer robot 2Z includes, as the operation device 2c, a wheel drive device that drives wheels, a GPS (all not illustrated), and the like. As will be described below, the transfer robot 2 executes first movement processing and second movement processing through communication with the control platform 5. In addition, the transfer robot 2Z acquires its own position and the like by the GPS.

Figure 3:
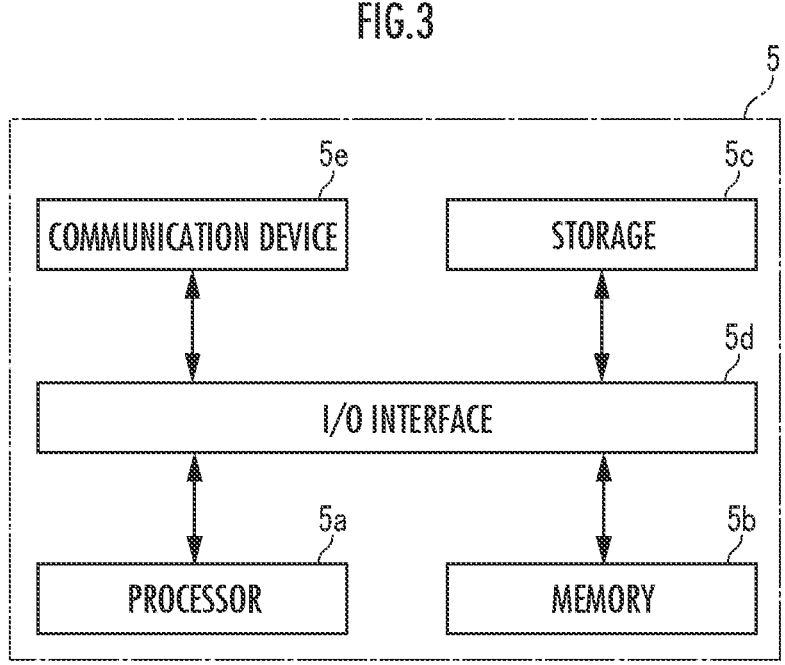
FIG. 3 is a block diagram illustrating the configuration of the control platform.

On the other hand, the control platform 5 controls the above-described plurality of robot groups, and specifically includes a server. As illustrated in FIG. 3, the control platform 5 includes a processor 5a, a memory 5b, a storage 5c, an I/O interface 5d, a communication device 5e, and the like.

The memory 5b includes a RAM, an E2PROM, a ROM, and the like, and stores link data and the like described below therein.

As described above, the communication device 5e is connected to the robot 2 described above via the communication network 3a, and is connected to the client server 7 and the user terminal 8 in a cloud 6 via communication networks 3b and 3c. Both of these communication networks 3b and 3c are configured by the Internet.

With the above configuration, the control platform 5 is configured to be able to intercommunicate with the robot 2, the client server 7, and the user terminal 8 via the communication device 5e. The client server 7 stores various data in the control platform 5.

In addition, each of the plurality of user terminals 8 is configured by a personal computer, and includes an input device 8a, a display 8b, a communication device (not illustrated), and the like. The input device 8a includes a keyboard, a mouse, and the like.

In the user terminal 8, as described below, a user (not illustrated) operates the input device 8a to access the control platform 5, so that a service to be executed by the robot group is determined, and the robot group to execute the service (first task) is determined.

Figure 4:
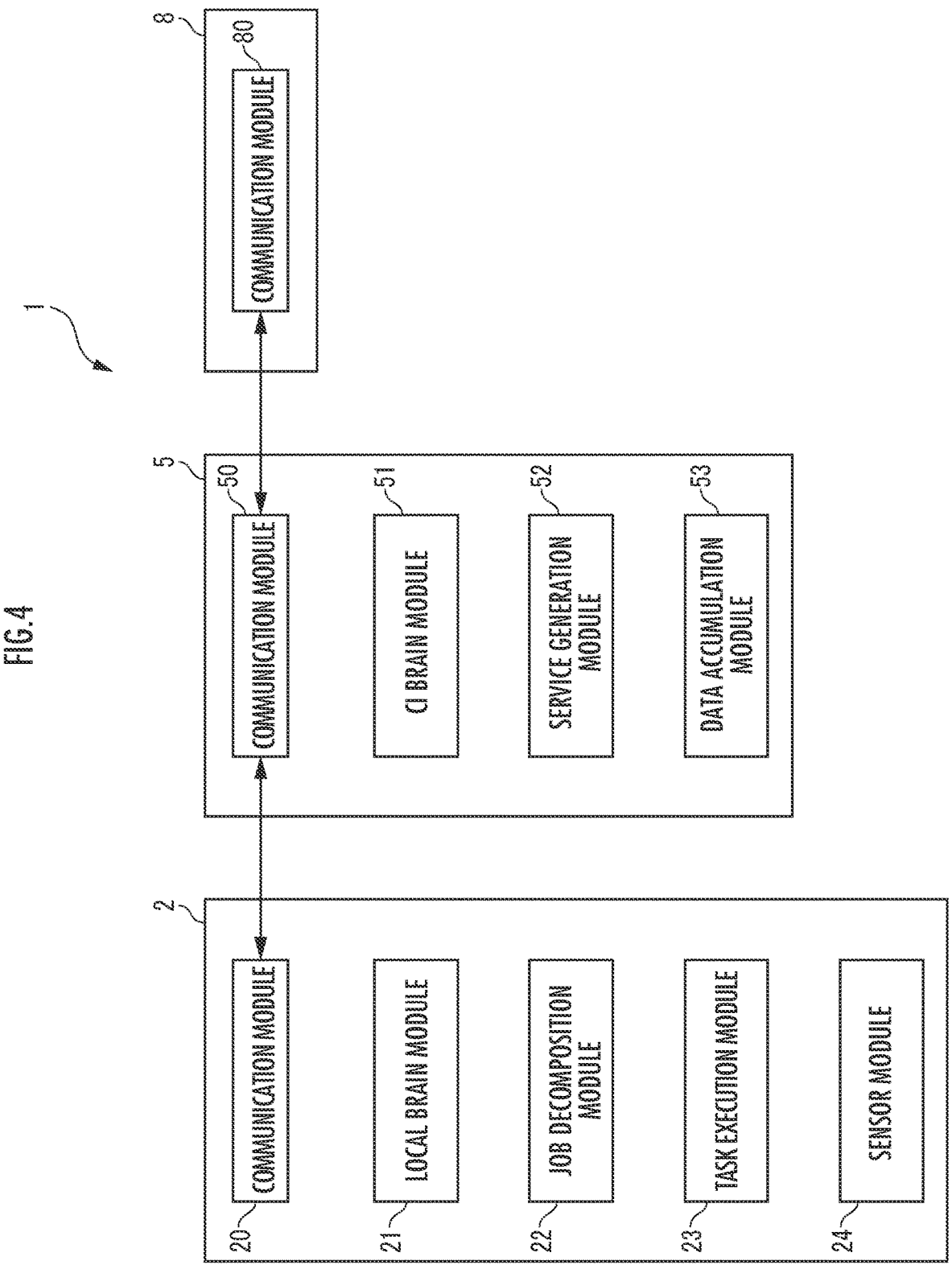
FIG. 4 is a block diagram illustrating functional configurations of the robot, the control platform, and a user terminal in the control system.

Next, functional configurations of the robot 2, the control platform 5, and the like in the control system 1 of the present embodiment will be described with reference to FIG. 4. First, the functional configuration of the user terminal 8 will be described. The user terminal 8 includes a communication module 80, and the communication module 80 is specifically configured by the above-described communication device.

The communication module 80 has a function of executing communication with a communication module 50 described below of the control platform 5, and in the case of the user terminal 8, the user can access a CI brain module 51 described below of the control platform 5 via the two communication modules 80 and 50 by operating the input device 8a described above. Accordingly, when the user determines a desired service, the user can select the robot group capable of executing the service from the plurality of robot groups.

Next, the functional configuration of the control platform 5 will be described. As illustrated in FIG. 4, the control platform 5 includes the communication module 50, the CI brain module 51, a service generation module 52, and a data accumulation module 53.

In the present embodiment, the communication module 50 corresponds to a communication unit, and the CI brain module 51 corresponds to a first task recognition unit, an effector group recognition unit, and a task assignment unit.

The communication module 50 is specifically configured by the above-described communication device 5e. As will be described below, the communication module 50 has a function of executing communication with the communication module 80 of the user terminal 8 described above and a communication module 20 described below of the robot 2 when the communication module 50 controls the robot group. More specifically, as will be described below, the communication module 50 has a function of transmitting various command signals representing each job to the robot 2 and a function of receiving various end signals from the robot 2.

The three modules 51 to 53 specifically include the above-described processor 5a, memory 5b, and storage 5c, and the CI brain module 51 has a plurality of functions as described below.

First, the CI brain module 51 has a function of recognizing the service desired by the user through communication with the user terminal 8, searching for the robot group capable of executing the service by accessing the service generation module 52 and referring to link data described below, and transmitting the search result to the user terminal 8.

When the robot group that executes the service is selected by the user, the CI brain module 51 has a function of decomposing the service into a plurality of jobs and assigning each of the plurality of jobs to each of the plurality of robots 2 in the robot group.

The CI brain module 51 has a function of determining a schedule for transmitting a command signal including the job to each of the robots 2 so that each of the robots 2 can suitably execute the job assigned as described above.

In this case, the above functions of the CI brain module 51 correspond to the function of "recognizing the first task through communication with the user terminal" and the function of "recognizing one effector group for executing the first task based on the communication with the user terminal and the link data of the storage unit".

On the other hand, the service generation module 52 has a function of storing data of the plurality of robot groups provided in the control system 1, the link data in which the service executable by the plurality of robot groups and the plurality of robot groups are linked, and the like.

The service generation module 52 has a function of enabling the user to edit the link data, the data of the plurality of robot groups, and the like by accessing the service generation module 52 via the user terminal 8. In addition, the service generation module 52 has a function of monitoring the plurality of robot groups.

On the other hand, the data accumulation module 53 has a function of storing and accumulating operation data of each of the robots 2 and data such as an execution state (such as a time and the number of times) of each service and a maintenance state of each of the robots 2.

Next, the functional configuration of the robot 2 will be described. As illustrated in FIG. 4, the robot 2 includes a communication module 20, a local brain module 21, a job decomposition module 22, a task execution module 23, and a sensor module 24.

In the present embodiment, the job decomposition module 22 corresponds to a third task recognition unit, and the task execution module 23 corresponds to an operation executing unit.

The communication module 20 is specifically configured by the above-described communication device 2b. As will be described below, the communication module 20 has a function of executing communication with the above-described communication module 50 of the control platform 5 when the robot 2 is controlled by the control platform 5.

The three modules 21 to 23 are specifically configured by the controller 2a described above. The local brain module 21 has a function of outputting a job in a job data signal to the job decomposition module 22 when the local brain module 21 receives the job data signal from the control platform 5.

On the other hand, the job decomposition module 22 stores link data defining a relationship between the job and the task, and has a function of decomposing the job from the local brain module 21 into a plurality of the tasks for recognition, converting the job into the single task for recognition, and outputting the plurality of tasks or the single task to the local brain module 21.

The local brain module 21 further includes a function of outputting the plurality of tasks or the single task from the job decomposition module 22 to the task execution module 23.

On the other hand, the task execution module 23 has a function of controlling the operation device 2c of the robot 2 according to the plurality of tasks or the single task from the local brain module 21.

In addition, the sensor module 24 specifically includes the sensor device 2d, detects task information indicating a task execution state by the operation device 2c and the above-described operation environment information, and outputs these pieces of information to the local brain module 21.

The local brain module 21 has a function of transmitting the task information and the operation environment information from the sensor module 24 to the control platform 5 via the communication module 20.

Next, control operation of the robot group in the control system 1 configured as described above will be described with reference to FIG. 5. During execution of the control operation, operation states and the like of three robots 2X to 2Z described below are configured to be able to be constantly monitored on the user terminal 8 side.

Figure 5:
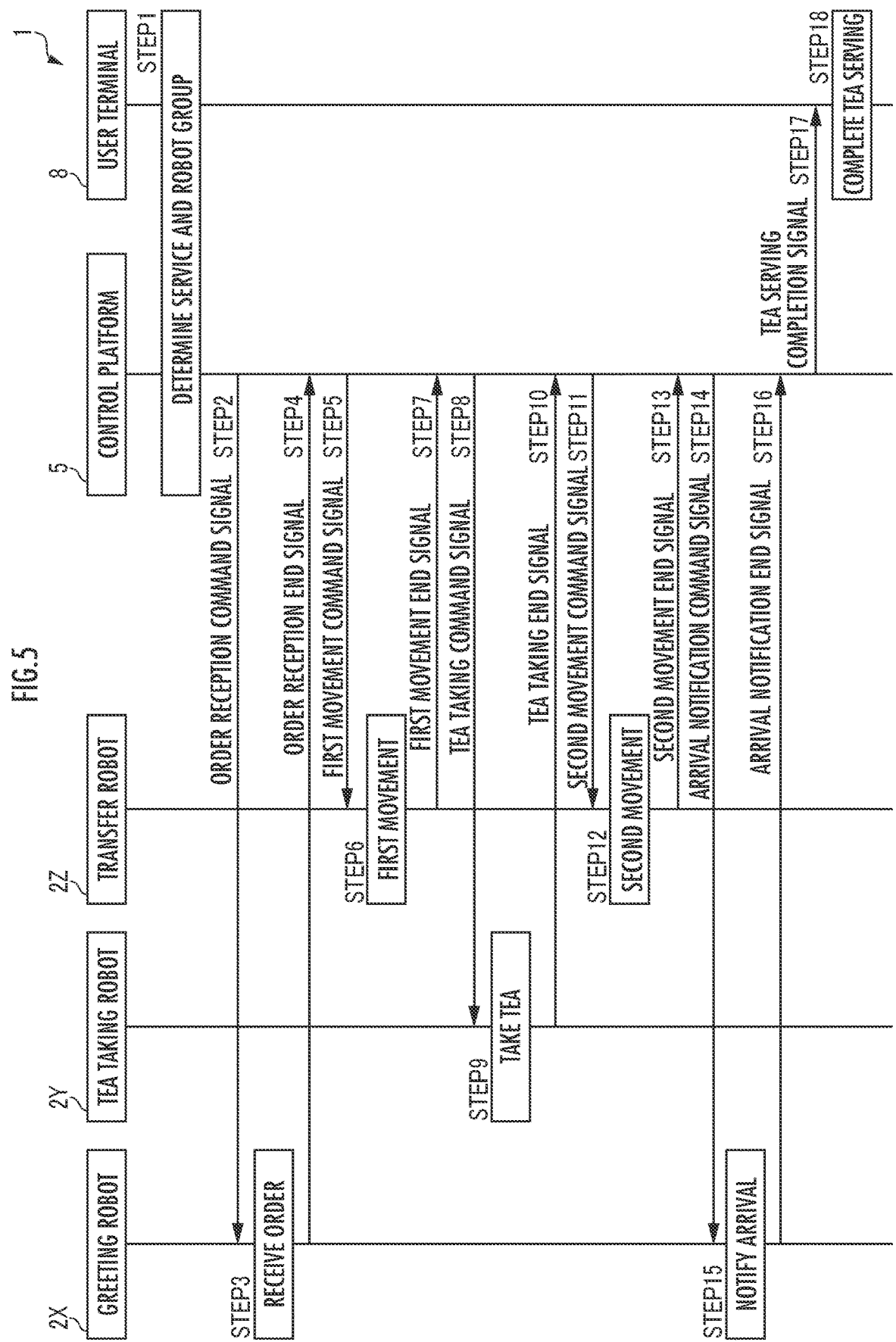
FIG. 5 is a diagram illustrating an example of control operation of a robot group in the control system.

As illustrated in FIG. 5, first, service and robot group determination processing is executed (FIG. 5/STEP 1). In this service and robot group determination processing, as described below, the service is determined by communication between the control platform 5 and the user terminal 8, and the robot group that executes the service is selected/determined.

First, when a guest is recognized in a predetermined service area, the user accesses the CI brain module 51 of the control platform 5 via the user terminal 8 to determine the service to be executed by the robot group.

Then, when the service is determined, the CI brain module 51 refers to the link data in the service generation module 52 to search for the robot group capable of executing the service, and notifies the user terminal 8 of the search result. Accordingly, when there are the plurality of robot groups capable of executing the service, any one of the plurality of robot groups is selected by the operation of the user terminal 8 by the user.

In the following description, an example will be described in which, as the service, a "tea serving service" for providing PET bottle type tea is determined by the user, and the robot group including the three robots, that is, the greeting robot 2X, the tea taking robot 2Y, and the transfer robot 2Z (see FIG. 1) is selected from the robot group capable of executing the "tea serving service".

As described above, when the user selects the robot group (three robots 2X to 2Z) that executes the "tea serving service" after the "tea serving service" is determined by the user, in the CI brain module 51, the "tea serving service" is decomposed into an "order reception job", a "first movement job", a "tea taking job", a "second movement job", and an "arrival notification job" and recognized. In the present embodiment, the "order reception job", the "first movement job", the "tea taking job", the "second movement job", and the "arrival notification job" correspond to the second task.

Next, in the CI brain module 51, the "order reception job" and the "arrival notification job" are assigned to the greeting robot 2X, and the "tea taking job" is assigned to the tea taking robot 2Y. In addition, the "first movement job" and the "second movement job" are assigned to the transfer robot 2Z.

In addition, in the CI brain module 51, a transmission schedule of the command signal (such as order reception command signal described below) including the above five jobs to the three robots 2X to 2Z is determined.

Returning to FIG. 5, after the service and robot group determination processing is executed as described above, the order reception command signal is transmitted from the control platform 5 to the greeting robot 2X (FIG. 5/STEP 2). The order reception command signal (second task signal) is a signal including the above-described "order reception job".

When the greeting robot 2X receives the order reception command signal, the greeting robot 2X executes the order reception processing as described below (FIG. 5/STEP 3). First, in the job decomposition module 22, the "order reception job" included in the order reception command signal is converted into an "order reception task" and recognized.

Next, the operation device 2c of the greeting robot 2X is controlled according to the "order reception task" by the task execution module 23. Specifically, the guest is visually recognized by the camera of the operation device 2c, a greeting is emitted from the speaker of the operation device 2c, and a voice indicating an order of the guest is received by the microphone of the operation device 2c.

After the greeting robot 2X executes the order reception processing as described above, the greeting robot 2X transmits an order reception end signal to the control platform 5 (FIG. 5/STEP 4). The order reception end signal is a signal indicating an order content (for example, black tea) of the guest described above.

When the control platform 5 receives the order reception end signal, the control platform 5 transmits a first movement command signal to the transfer robot 2Z (FIG. 5/STEP 5). The first movement command signal (second task signal) is a signal including the "first movement job" described above.

When the transfer robot 2Z receives the first movement command signal, the transfer robot 2Z executes the first movement processing as described below (FIG. 5/STEP 6). First, in the job decomposition module 22, the "first movement job" included in the first movement command signal is converted into a "first movement task" and recognized.

Next, the operation device 2c of the transfer robot 2Z is controlled by the task execution module 23 according to the "first movement task". Specifically, the operation device 2c is controlled such that the transfer robot 2Z moves to the vicinity of the tea taking robot 2Y As described above, when the first movement processing is executed and the transfer robot 2Z moves to the vicinity of the tea taking robot 2Y, a first movement end signal is transmitted from the transfer robot 2Z to the control platform 5 (FIG. 5/STEP 7). The first movement end signal is a signal indicating that the transfer robot 2Z has moved to the vicinity of the tea taking robot 2Y.

When the control platform 5 receives the first movement end signal, the control platform 5 transmits a tea taking command signal to the tea taking robot 2Y (FIG. 5/STEP 8). The tea taking command signal (second task signal) is a signal including the "tea taking job" described above.

When the tea taking robot 2Y receives the tea taking command signal, the tea taking robot 2Y executes the tea taking processing as described below (FIG. 5/STEP 9). First, in the job decomposition module 22, the "tea taking job" included in the tea taking command signal is decomposed into a "tea recognition task", a "tea gripping task", and a "tea placement task" and recognized.

Next, the task execution module 23 controls the operation device 2c of the tea taking robot 2Y as described below in accordance with the "tea recognition task", the "tea gripping task", and the "tea placement task".

First, a PET bottle of "black tea" ordered by the guest is recognized by the camera of the operation device 2c. Next, the PET bottle of "black tea" ordered by the guest is gripped by the robot arm of the operation device 2c and then placed on a placement place of the transfer robot 2Z.

As described above, when the tea taking processing is executed and the PET bottle of "black tea" is placed in the placement place of the transfer robot 2Z, a tea taking end signal is transmitted from the tea taking robot 2Y to the control platform 5 (FIG. 5/STEP 10). The tea taking end signal is a signal indicating that the PET bottle of "black tea" is placed in the placement place of the transfer robot 2Z.

When the control platform 5 receives the tea taking end signal, the control platform 5 transmits a second movement command signal to the transfer robot 2Z (FIG. 5/STEP 11). The second movement command signal (second task signal) is a signal including the "second movement job" described above.

When the transfer robot 2Z receives the second movement command signal, the transfer robot 2Z executes the second movement processing as described below (FIG. 5/STEP 12). First, in the job decomposition module 22, the "second movement job" included in the second movement command signal is converted into a "second movement task" and recognized.

Next, the operation device 2c of the transfer robot 2Z is controlled by the task execution module 23 according to the "second movement task". Specifically, the operation device 2c is controlled such that the transfer robot 2Z moves to the vicinity of the guest.

As described above, when the second movement processing is executed and the transfer robot 2Z moves to the vicinity of the guest, a second movement end signal is transmitted from the transfer robot 2Z to the control platform 5 (FIG. 5/STEP 13). The second movement end signal is a signal indicating that the transfer robot 2Z has moved to the vicinity of the guest.

When the control platform 5 receives the second movement end signal, the control platform 5 transmits an arrival notification command signal to the greeting robot 2X (FIG. 5/STEP 14). The arrival notification command signal (second task signal) is a signal including the "arrival notification job" described above.

When the greeting robot 2X receives the arrival notification command signal, the greeting robot 2X executes the arrival notification processing as described below (FIG. 5/STEP 15). First, the "arrival notification job" included in the arrival notification command signal is converted into an "arrival notification task" and recognized by the job decomposition module 22.

Next, the operation device 2c of the greeting robot 2X is controlled according to the "arrival notification task" by the task execution module 23. Specifically, a voice indicating that the PET bottle of "black tea" has arrived is output from the speaker of the operation device 2c to the guest.

As described above, when the arrival notification processing is executed and the voice indicating that the PET bottle of "black tea" has arrived is output to the guest, an arrival notification end signal is transmitted from the greeting robot 2X to the control platform 5 (FIG. 5/STEP 16). The arrival notification end signal is a signal indicating that a voice notifying that the PET bottle of "black tea" has arrived has been output from the greeting robot 2X to the guest.

When the control platform 5 receives the arrival notification end signal, the control platform 5 transmits a tea serving completion signal to the user terminal 8 (FIG. 5/STEP 17). The tea serving completion signal is a signal indicating completion of the "tea serving service".

When the user terminal 8 receives the tea serving completion signal, the user terminal 8 executes tea serving completion processing (FIG. 5/STEP 18). In the tea serving completion processing, completion of the "tea serving service" is displayed on the display 8b. As described above, the control operation in the control system 1 is executed.

As described above, according to the control platform 5 of the control system 1 of the first embodiment, in the CI brain module 51, the "tea serving service" desired by the user is determined through communication with the user terminal 8, and the robot group capable of executing the "tea serving service" is searched from the link data. Then, the robot group (robots 2X to 2Z) to execute the service is selected by the user based on the search result.

Next, the "tea serving service" is decomposed into the "order reception job", the "first movement job", the "tea taking job", the "second movement job", and the "arrival notification job" and recognized, and these jobs are assigned to the robots 2X to 2Z. In addition, a schedule for transmitting various command signals including the jobs to the robots 2X to 2Z is determined so that the robots 2X to 2Z can suitably execute the jobs thus assigned. Therefore, when the robots 2X to 2Z execute different predetermined operations, the robots 2X to 2Z can be controlled so that the robots 2X to 2Z suitably execute the service.

In each of the robots 2X to 2Z, when various command signals are received by the communication device 2b, the operation device 2c is controlled such that the job represented by the command signal is recognized as one task or decomposed into three tasks, and predetermined operations corresponding to these tasks are executed. As described above, each of the robots 2X to 2Z executes the predetermined operation corresponding to the task, whereby the service is suitably executed. As a result, it is possible to realize the control platform 5 and the control system 1 such that the robot group suitably executes the service.

In addition, in the tea taking robot 2Y, the "tea taking job" included in the tea taking command signal is decomposed into three tasks, that is, the "tea recognition task", the "tea gripping task", and the "tea placement task" and recognized, and the camera and the robot arm of the operation device 2c are controlled so as to execute these tasks. Accordingly, since the plurality of tasks can be executed by the single robot 2Y, usefulness of the control system 1 can be improved.

Although the first embodiment is an example in which the service is the first task, the first task of the present invention is not limited thereto, and may be configured by combining a plurality of predetermined operations. For example, assembling of a structure, laying of a road, disassembly of a structure, and the like may be set as the first task.

Although the first embodiment is an example in which the job is the second task, the second task of the present invention is not limited thereto, and the first task may be recognized as a plurality of second tasks. For example, when the first task is the assembly of a structure, transportation of constituent members of the structure, installation of the constituent members, connection of the constituent members, and the like may be set as the second task.

In addition, although the first embodiment is an example in which the task is the third task, the third task of the present invention is not limited thereto, and the second task may be recognized as a single third task or a plurality of third tasks. For example, when the first task is the assembly of a structure and the second task includes the transportation of constituent members of the structure, the installation of the constituent members, the connection of the constituent members, and the like, gripping of the constituent members, direction conversion, and the like may be set as the third task.

On the other hand, although the first embodiment is an example in which the server is used as the control platform 5, the control platform of the present invention is not limited thereto, and may include the communication unit, the storage unit, an effector group selection unit, and the task assignment unit. For example, a distributed computing system, various resources in cloud computing, or the like may be used as the control platform.

Although the first embodiment is an example in which the plurality of robots 2 are used as a plurality of effectors, the plurality of effectors of the present invention are not limited thereto, and may include those that are communicably connected to the control platform via a first communication network and execute different predetermined operations.

For example, as the plurality of effectors, those that execute at least one predetermined operation involving physical events such as movement, excitation, driving, blowing, light emission, sound generation, and odor generation may be used in combination. As the plurality of effectors, a locking/unlocking device that automatically performs locking/unlocking, a light emitting device, and the like may be used in combination.

In addition, although the first embodiment is an example in which the greeting robot 2X, the tea taking robot 2Y, and the transfer robot 2Z are used as the plurality of robots 2, robots that execute operations other than these operations may be used as the plurality of robots 2. For example, as the plurality of robots, a sound generation robot that executes only sound generation, a light emission robot that executes only light emission, a blowing robot that executes only air blowing, and other robots may be used.

On the other hand, although the first embodiment is an example in which the terminal of the personal computer type is used as the user terminal, the user terminal of the present invention is not limited thereto, and may be any user terminal that is communicably connected to the control platform via a second communication network and operated by the user. For example, a smartphone, a tablet PC, or the like may be used as the user terminal.

Although the first embodiment is an example in which the communication network 3a that is a wireless communication network is used as the first communication network, the first communication network of the present invention is not limited thereto, and may be any network that communicably connects the control platform and the effector. For example, a wired communication network such as a wired LAN communication network may be used as the first communication network.

In addition, although the first embodiment is an example in which the communication network 3c that is the Internet is used as the second communication network, the second communication network of the present invention is not limited thereto, and may be any network that communicably connects the control platform and the user terminal. For example, a wireless communication network such as a wireless LAN communication network or a wired communication network such as a wired LAN communication network may be used as the second communication network. The second communication network may be the same communication network as the first communication network or may be a different communication network.

Next, a service providing system according to a second embodiment of the present invention will be described. As will be described below, the service providing system of the present embodiment provides a robot service by a robot as an effector to a user thereof (hereinafter referred to as "user") or the like.

Figure 6:
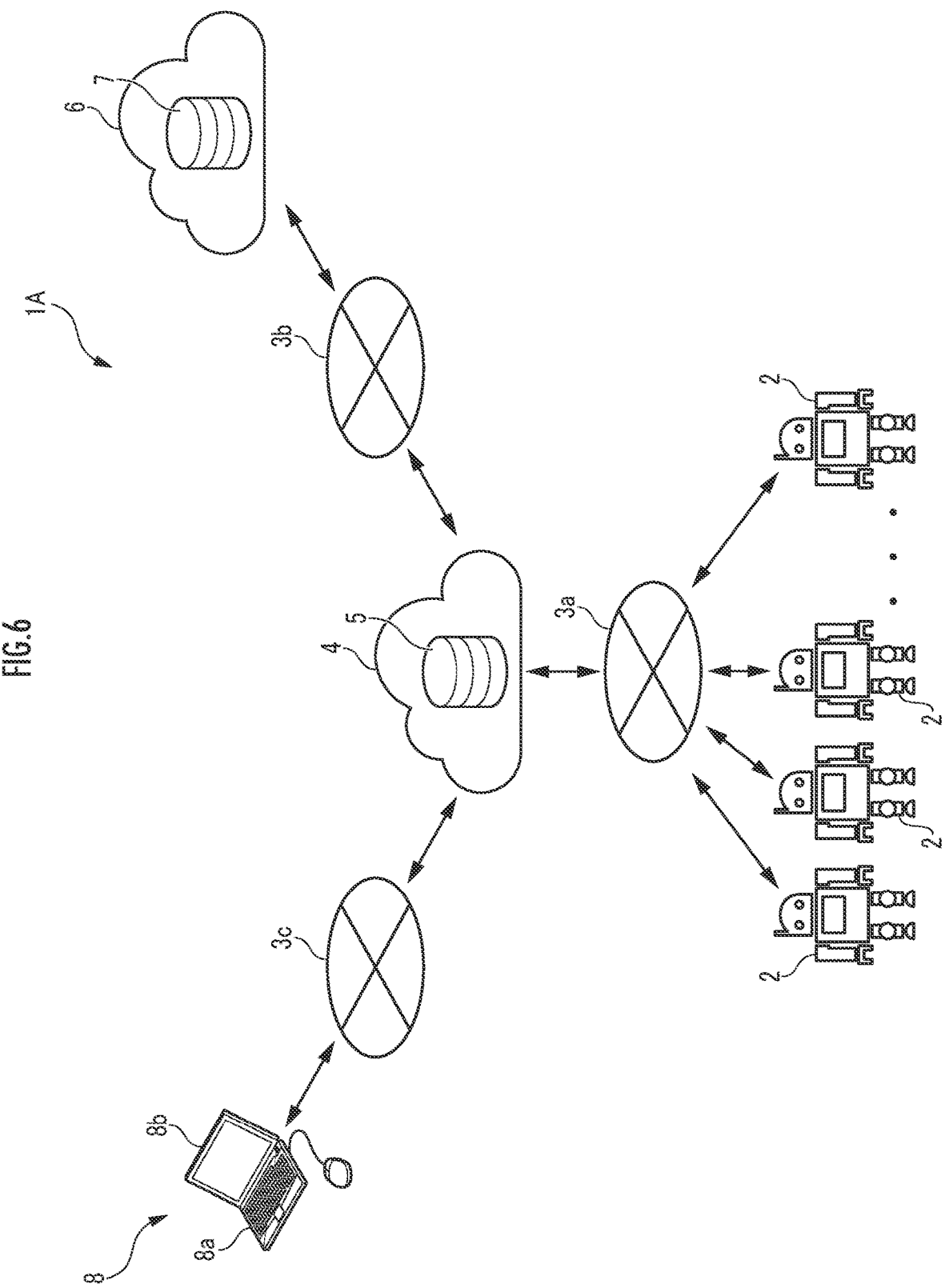
FIG. 6 is a diagram schematically illustrating a configuration of a service providing system according to a second embodiment of the present invention.

As illustrated in FIG. 6, similarly to the control system 1 of the first embodiment, a service providing system 1A includes a large number of robots 2 (only four are illustrated), a control platform 5, a client server 7, a plurality of user terminals 8 (only one is illustrated), and the like.

Figure 7:
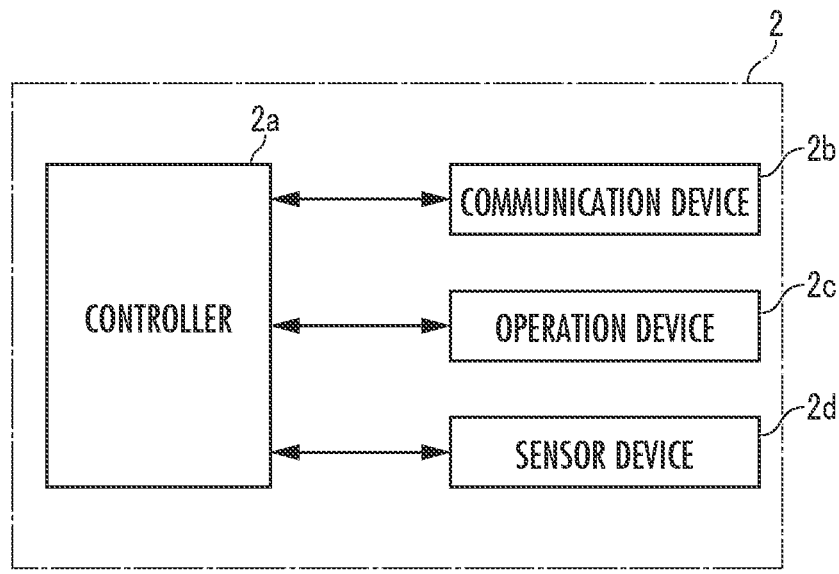
FIG. 7 is a block diagram illustrating an electrical configuration of the robot.

First, each of the large number of robots 2 will be described. As illustrated in FIG. 7, each of the robots 2 includes a controller 2a, a communication device 2b, an operation device 2c, a sensor device 2d, and the like.

The controller 2a is used for controlling the communication device 2b and the operation device 2c, and includes a computer including a processor, a storage, an I/O interface (all not illustrated), and the like. The controller 2a has an AI learning function, and an operation characteristic of each of the robots 2 is formed by the AI learning function during operation of each of the robots 2.

The communication device 2b is connected to the control platform 5 in cloud computing (hereinafter referred to as "cloud") 4 via a communication network 3a that is a wireless communication network, and is thereby configured to be capable of wireless communication with the control platform 5.

In the communication device 2b, one SIM card (not illustrated) that is contracted with a communication company is built in, and the SIM card is contracted with the communication company with one identification number. Thus, the communication device 2b executes wireless communication with the control platform 5 using this identification number as identification information.

The operation device 2c is a device for executing various operations, and specifically includes at least one device of a six-degree-of-freedom arm, a three-finger hand, a speaker, and the like, a moving device for moving the robot 2, and the like.

In addition, the sensor device 2d is used for detecting operation environment information, indicating a surrounding environment state of the robot 2, and the like, and specifically includes at least one device of a high-resolution camera, a telephoto camera, an infrared camera, a metal detection sensor, a microphone, a GPS (all not illustrated), and the like.

Although FIG. 6 illustrates humanoid robots as the large number of robots 2, the large number of robots 2 of the present embodiment have a simpler structure (not illustrated) than the humanoid robot, and include a robot of a type that executes a single predetermined operation and a robot of a type that executes a plurality of predetermined operations. Specifications and the like of these robots 2 will be described below.

In the present embodiment, the plurality of the robot groups are provided regarding the robot group, including the plurality of robots 2 of the large number of robots 2, as one. Each of the plurality of robot groups is configured to execute a predetermined service by execution of different predetermined operations by the plurality of robots 2. These robot groups will be described below.

Figure 8:
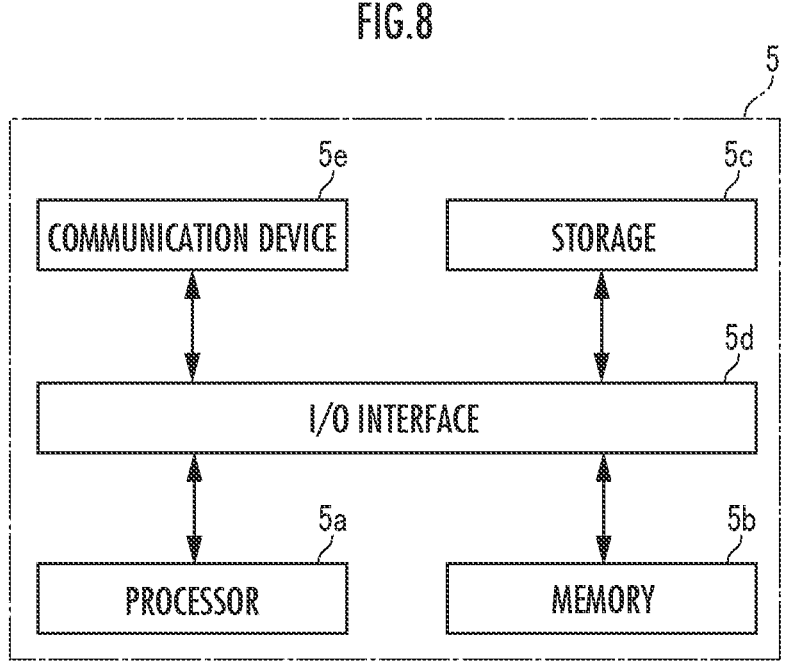
FIG. 8 is a block diagram illustrating an electrical configuration of the control platform.

On the other hand, the control platform 5 executes control of the robot group and the like, and specifically includes a server. As illustrated in FIG. 8, the control platform 5 includes a processor 5a, a memory 5b, a storage 5c, an I/O interface 5d, a communication device 5e, and the like.

The memory 5b includes a RAM, an E2PROM, a ROM, and the like, and stores a database and the like described below therein.

As described above, the communication device 5e is connected to the robot 2 described above via the communication network 3a, and is connected to the client server 7 and the user terminal 8 in a cloud 6 via communication networks 3b and 3c. Both of these communication networks 3b and 3c are configured by the Internet.

With the above configuration, the control platform 5 is configured to be able to intercommunicate with the robot 2, the client server 7, and the user terminal 8 via the communication device 5e. The client server 7 stores various data in the control platform 5.

In addition, each of the plurality of user terminals 8 is configured by a personal computer, and includes an input device 8a, a display 8b, a communication device (not illustrated), and the like. The input device 8a includes a keyboard, a mouse, and the like. In the present embodiment, the input device 8a corresponds to an input interface, and the display 8b corresponds to an output interface.

In the user terminal 8, data transmission and reception with respect to the control platform 5 is executed via the communication device according to operation of the input device 8a by a builder of the robot service or the user.

The builder (hereinafter referred to as "service builder") of the robot service executes operation of data transmission and reception with respect to the control platform 5 via the user terminal 8 in order to create (build) a robot service recipe, as described below.

On the other hand, as will be described below, the user executes the operation of data transmission and reception with respect to the control platform 5 via the user terminal 8 in order to use the robot service. Accordingly, the user can select one robot group from the plurality of robot groups capable of executing a desired service.

Next, functional configurations of the robot 2, the control platform 5, and the user terminal 8 in the service providing system 1A of the present embodiment will be described with reference to FIG. 9. First, the functional configuration of the user terminal 8 will be described. The user terminal 8 includes a communication module 80 (terminal-side communication unit), and the communication module 80 is specifically configured by the above-described communication device.

The communication module 80 has a function of executing communication with a communication module 50 described below of the control platform 5. In the case of the user terminal 8, the service builder or the user can access the control platform 5 via the two communication modules 80 and 50 by operating the input device 8a described above.

Next, the functional configuration of the control platform 5 will be described. As illustrated in FIG. 9, the control platform 5 includes the communication module 50 and the CI brain module 51. In the present embodiment, the communication module 50 corresponds to a communication unit, and the CI brain module 51 corresponds to a service data storage unit, a requesting service recognition unit, a possible effector group determination unit, and a schedule determination unit.

The communication module 50 specifically includes the communication device 5e describe above and has a function of executing communication with the communication module 80 of the user terminal 8 described above and a communication module 20 of the robot 2 described below.

The CI brain module 51 specifically includes the above-described processor 5a, memory 5b, and storage 5c. Furthermore, the CI brain module 51 includes, as functional configurations, a search unit 52, a robot specification database (denoted as "robot specification DB" in FIG. 9) 53, a list creation unit 54, and a service recipe database (denoted as "service recipe DB" in FIG. 9) 55.

As will be described below, when the search unit 52 receives a requirement signal from the user terminal 8, the search unit 52 searches the robot specification database 53 to search for the robot that satisfies a requirement in the requirement signal. The robot specification database 53 stores the specifications of the large number of robots 2 (see FIG. 11 described below) as the database.

In addition, as will be described below, the list creation unit 54 creates a list of the robot group (see FIG. 16 described below) by referring to the service recipe database 55. On the other hand, the service recipe database 55 stores service recipes (see FIG. 14 described below) such as a security service, a reception service, and a transfer service.

Next, the functional configuration of the robot 2 will be described. As illustrated in FIG. 9, the robot 2 includes a communication module 20, a local brain module 21, a job decomposition module 22, a task execution module 23, and a sensor module 24.

The communication module 20 (effector receiving unit) specifically includes the communication device 2b described above, and has a function of transmitting and receiving a signal to and from the control platform 5.

The three modules 21 to 23 are specifically configured by the controller 2a described above. The local brain module 21 has a function of outputting a job in a job command signal described below to the job decomposition module 22 when the local brain module 21 receives the job command signal from the control platform 5.

On the other hand, the job decomposition module 22 stores link data defining a relationship between the job and the task, and has a function of decomposing the job from the local brain module 21 into a plurality of the tasks for recognition, converting the job into the single task for recognition, and outputting the plurality of tasks or the single task to the local brain module 21.

The local brain module 21 further includes a function of outputting the plurality of tasks or the single task from the job decomposition module 22 to the task execution module 23.

On the other hand, the task execution module 23 (operation executing unit) has a function of controlling the operation device 2c of the robot 2 according to the plurality of tasks or the single task from the local brain module 21.

In addition, the sensor module 24 specifically includes the sensor device 2d described above, detects task information indicating a task execution state by the operation device 2c and the above-described operation environment information, and outputs these pieces of information to the local brain module 21.

The local brain module 21 has a function of transmitting the task information and the operation environment information from the sensor module 24 to the control platform 5 via the communication module 20.

Next, processing of creating a service recipe (service data) will be described with reference to FIG. 10. This processing creates (builds) service recipes of various robot services, and is executed by operation of the user terminal 8 by the service builder and communication operation between the user terminal 8 and the control platform 5 accompanying the operation.

As illustrated in FIG. 10, first, the input device 8a of the user terminal 8 is operated by the service builder, whereby requirements of various robot services are input (FIG. 10/STEP 21). The requirements in this case are determined by the service builder as described below.

As an example, a method of determining the requirement in a case where the robot service is a security robot service will be described. First, the service builder creates, for example, the following service scenarios (A1) to (A7) and service scenarios (B1) to (B5) as scenarios of "patrol operation" and "operation of checking the inside of a trash can" in the security robot service.

[Patrol Operation (for Example, Patrol Robot)]
    (A1) A patrol route is determined.
    (A2) Suspicious person information is input.
    (A3) A suspicious person is found.
    (A4) The suspicious person is notified.
    (A5) A patrol inspection object is input.
    (A6) The patrol inspection object (trash can) is found.
    (A7) A check of the inside of the patrol inspection object (trash can) is requested.

[Operation of Checking Inside of Trash can (for Example, Inspection Robot and Inspection Support Robot)]
    (B1) A robot moves to a trash can.
    (B2) A lid (3 kg) of the trash can is opened.
    (B3) The inside of the trash can is checked with a camera.
    (B4) The inside of the trash can is checked with a sensor.
    (B5) The lid of the trash can is closed.

Next, as requirements necessary for executing the above service scenarios (A1) to (A7) and (B1) to (B5), the following requirements (C1) to (C4) are determined by the service builder.
    (C1) A suspicious person or the like is inspected with a high-resolution telephoto camera.
    (C2) A 3 kg lid on a trash can is lifted.
    (C3) Inspection is performed with an infrared camera.
    (C4) Inspection is performed with a metal detection sensor.

When the requirements (C1) to (C4) determined as described above are input to the user terminal 8 by operation of the input device 8a by the service builder, the requirement signal representing these requirements (C1) to (C4) is transmitted from the user terminal 8 to the control platform 5 (FIG. 10/STEP 22).

When the control platform 5 receives this requirement signal, the control platform 5 searches for the robot (FIG. 10/STEP 23). Specifically, the search unit 52 searches the robot specification database 53 according to the requirements (C1) to (C4) to search for the robot that satisfies these requirements (C1) to (C4). The robot specification database 53 stores detailed specification data of various robots 2I, 2E, . . . as illustrated in FIG. 11.

By searching the robot specification database 53, for example, search results of robots 2A to 2L as listed in FIG. 12 are acquired as search results of the robot that satisfies the requirements (C1) to (C4).

When the search results of the robots 2A to 2L that satisfy the requirements (C1) to (C4) are acquired as described above, search result signals representing these search results are transmitted from the control platform 5 to the user terminal 8 (FIG. 10/STEP 24).

When the user terminal 8 receives the search result signal, the user terminal 8 displays the search results of the robots 2A to 2L on the display 8b (FIG. 10/STEP 25).

Next, the service builder selects a combination of the robots (hereinafter referred to as "robot group") that satisfy the requirements (C1) to (C4) by operating the input device 8a in a state where the search results of the robots 2A to 2L are displayed on the display 8b (FIG. 10/STEP 26).

In this case, for example, as illustrated in FIG. 13, the robot group including the three robots 2C, 2E, and 2I is selected as the robot group that executes the security service, and information such as a task executed by the robots 2C, 2E, and 2I, a type of service, an operation, and a service providing place is tagged to the selection result. Although not illustrated, the tasks executed by the robots 2C, 2E, and 2I are implemented in the robots 2C, 2E, and 2I, respectively, by the service builder.

As described above, when the robot group is selected, a selection result signal indicating the selection result is transmitted from the user terminal 8 to the control platform 5 (FIG. 10/STEP 27).

When the control platform 5 receives the selection result signal, the control platform 5 stores the selection result in the selection result signal as a part of the service recipe in the service recipe database 55 (FIG. 10/STEP 28).

By repeatedly executing STEPs 21 to 28 described above, a large number of service recipes are created and stored in the service recipe database 55. For example, as illustrated in FIG. 14, the service recipes such as the security service, the reception service, and the transfer service are created and stored in the service recipe database 55.

As described above, when the service recipe is created, a personal computer terminal (not illustrated) may be connected directly to the control platform 5 instead of the user terminal 8, and the service builder may operate the personal computer terminal to create the service recipe.

Next, robot service utilization processing will be described with reference to FIG. 15. This processing is executed when the user desires to use a predetermined robot service. In this processing, as described below, the robot group capable of executing the robot service is selected by the user, and an operation schedule of the robot group is determined by the control platform 5.

Figure 15:
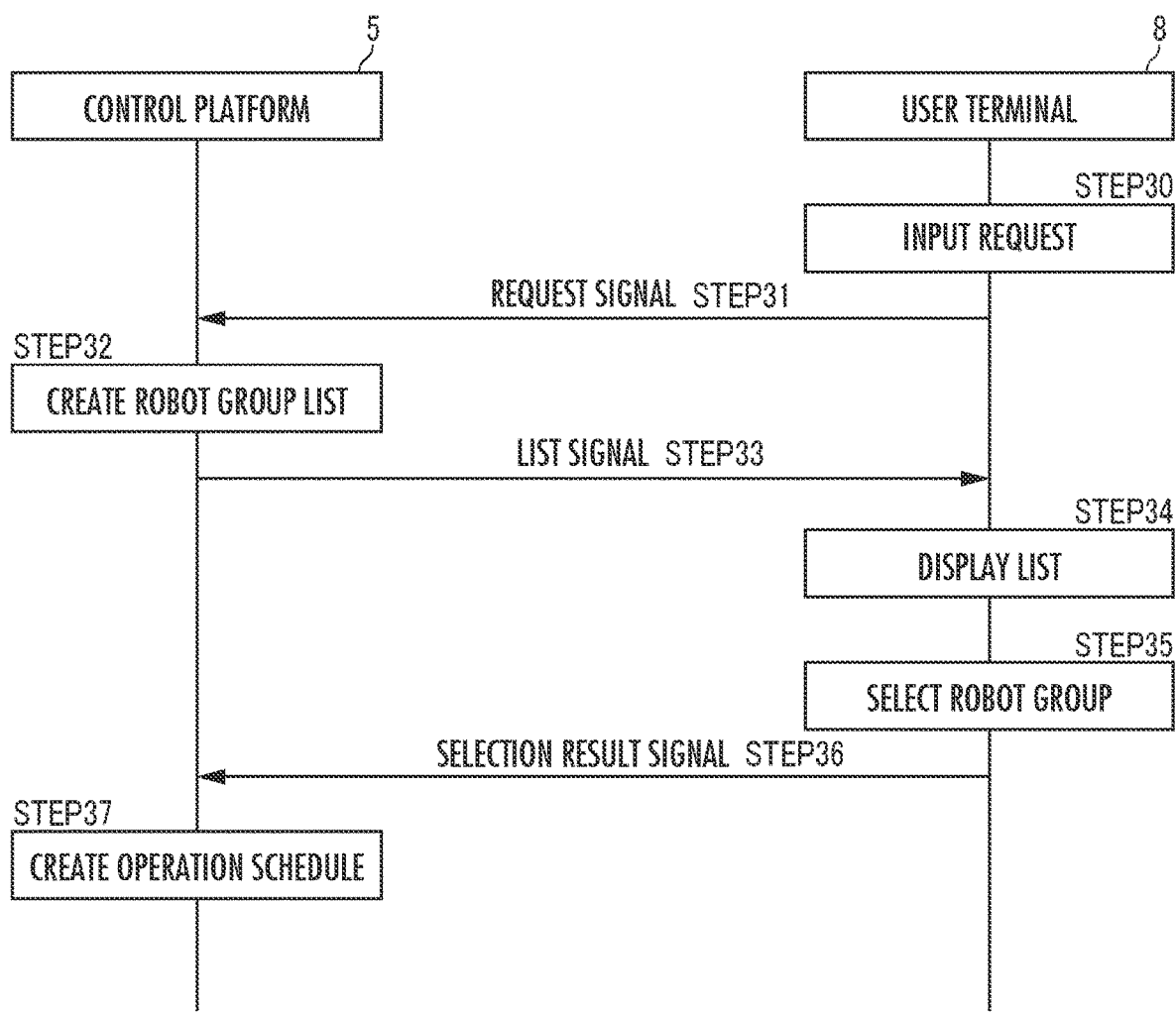
FIG. 15 is a sequence diagram illustrating robot service utilization processing.

As illustrated in FIG. 15, first, in the user terminal 8, the input device 8a is operated by the user, whereby a request of the user is input (FIG. 15/STEP 30). Hereinafter, a case where a user's request "want to execute robot service of tea serving in office" is input to the user terminal 8 will be described as an example.

As described above, when the request is input to the user terminal 8, a request signal indicating the request is transmitted from the user terminal 8 to the control platform 5 (FIG. 15/STEP 31).

When the control platform 5 receives this request signal, the control platform 5 creates a list of the robot group (FIG. 15/STEP 32). Specifically, the above-described list creation unit 54 creates a list of the robot group capable of realizing a service requested by the user (hereinafter referred to as "request service") by referring to the above-described service recipe database 55 based on a content of the request in the request signal. In the following description, the robot group capable of realizing the request service is appropriately referred to as a "possible robot group".

That is, the list creation unit 54 creates a list of the possible robot group based on the service (security service, reception service, and transfer service) of the robot group stored in the service recipe database 55 and a tag (task, type of service, operation, and service providing place) of each robot.

The list of the possible robot group is, for example, as illustrated in FIG. 16. In the list illustrated in FIG. 16, a first robot group is constituted by the three robots 2N, 2E, and 2O, and a second robot group is constituted by the three robots 2N, 2E, and 2P. This list is created so as to include a plurality of robot groups (not illustrated) other than the first and second robot groups. In the following description, each of the four robots 2N, 2E, 2O, and 2P will be referred to as "each of the robots 2".

In addition, as illustrated in FIG. 16, in this list, a functional specification and a characteristic specification in each of the robots 2 are described. This functional specification represents the functional specification (performance of microphone and arm, load bearing of robot itself, and the like) of each of the robots 2. Although not illustrated, as the functional specification, the state of charge SOC of a battery of each of the robots 2 is described, and when each of the robots 2 is present in one building, data such as the number of floors of a building where each of the robots 2 is currently located, a usable time period of each of the robots 2, whether each of the robots 2 is currently usable, and the like are also described.

In addition, the characteristic specification represents various characteristics of each of the robots 2, and specifically, various service recipes executable by each of the robots 2, the task of each of the robots 2, the operation characteristic of each of the robots 2, and the like are described. For example, the reception service, the security service, the transfer service, and other services are displayed as various service recipes, and reception, opening of a lid of a trash can, transfer, and other tasks are described as the tasks.

In addition, as the operation characteristic of each of the robots 2, such operation characteristics of the robot that can be visually determined by a human, such as a characteristic of fast but rough movement, a characteristic of slow but gentle movement, a characteristic of frank response, a characteristic of gentle response, a characteristic suitable for use in an airport, and a characteristic suitable for use in a cafe, are described. As described above, these operation characteristics are formed by the AI learning function of the controller 2a during the operation of each of the robots 2.

As described above, when the list of the robot group is created, a list signal (first data) indicating the list is transmitted from the control platform 5 to the user terminal 8 (FIG. 15/STEP 33).

When the user terminal 8 receives the list signal, the user terminal 8 displays the list of the possible robot group as illustrated in FIG. 16 on the display 8b (FIG. 15/STEP 34).

Next, the user operates the input device 8a to select one robot group from the plurality of robot groups in the list displayed on the display 8b (FIG. 15/STEP 35). For example, in the case of the robot service of tea serving, it is sufficient that the robot that transfers a tea has performance of a load bearing capacity of 5 kg, and thus the first robot group is selected.

When the user selects the robot group as described above, if the user is not satisfied with the specifications of the plurality of possible robot groups in the list displayed on the display 8b, the user may create a new possible robot group and use the new possible robot group as the selected robot group as described below.

That is, the user operates the input device 8a of the user terminal 8 to select one robot group and select the robot 2 having an unsatisfactory specification in the selected robot group. Next, the user replaces the robot 2 having the unsatisfactory specification with any of the robots 2 in the robot specification database 53 of the control platform 5 to create a new robot group, and thus to use the new robot group as the selected robot group.

As described above, when one robot group is selected by the user, a selection result signal (second data) representing the selection is transmitted from the user terminal 8 to the control platform 5 (FIG. 15/STEP 36).

When the control platform 5 receives this selection result signal, the control platform 5 creates, in the CI brain module 51, the operation schedule of the robot group in the selection result signal as described below (FIG. 15/STEP 37).

First, in the CI brain module 51, the "tea serving service" is decomposed into the "order reception job", the "first movement job", the "tea taking job", the "second movement job", and the "arrival notification job" and recognized.

Next, in the CI brain module 51, the "order reception job" and the "arrival notification job" are assigned to the robot 2N, and the "tea taking job" is assigned to the robot 2E. In addition, the "first movement job" and the "second movement job" are assigned to the robot 2O.

Then, in the CI brain module 51, a transmission schedule of the job command signal (such as order reception command signal described below) including the above five jobs to the three robots 2N, 2E, and 2O is determined. That is, the operation schedule of the robot group including the three robots 2N, 2E, and 2O is created. In the present embodiment, the job command signal corresponds to an operation schedule signal.

Figure 17:
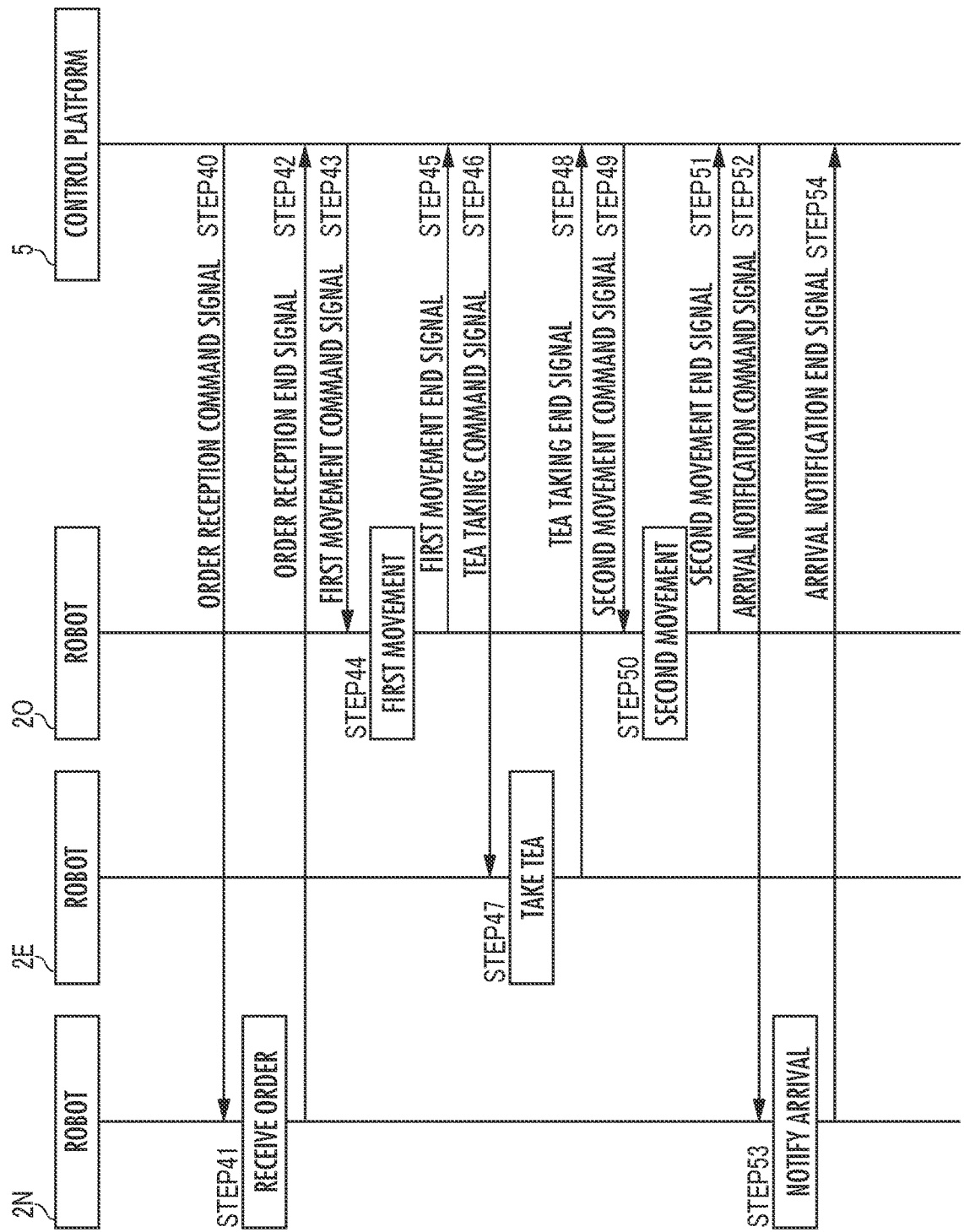
FIG. 17 is a sequence diagram illustrating control processing of the robot group.

In the service providing system 1A, when the operation schedule is created by the CI brain module 51 as described above, control processing of the three robots 2N, 2E, and 2O is executed as illustrated in FIG. 17.

As illustrated in FIG. 17, first, the order reception command signal is transmitted from the control platform 5 to the robot 2N (FIG. 17/STEP 40). The order reception command signal is a signal including the above-described "order reception job".

When the robot 2N receives the order reception command signal, the robot 2N executes the order reception processing as described below (FIG. 17/STEP 41). First, in the job decomposition module 22, the "order reception job" included in the order reception command signal is converted into an "order reception task" and recognized.

Next, the operation device 2c of the robot 2N is controlled according to the "order reception task" by the task execution module 23. Specifically, the guest is visually recognized by the camera of the operation device 2c, a greeting is emitted from the speaker of the operation device 2c, and a voice indicating an order of the guest is received by the microphone of the operation device 2c.

After the robot 2N executes the order reception processing as described above, the robot 2N transmits an order reception end signal to the control platform 5 (FIG. 17/STEP 42). The order reception end signal is a signal indicating an order content (for example, black tea) of the guest described above.

When the control platform 5 receives the order reception end signal, the control platform 5 transmits a first movement command signal to the robot 2O (FIG. 17/STEP 43). The first movement command signal is a signal including the "first movement job" described above.

When the robot 2O receives the first movement command signal, the robot 2O executes the first movement processing as described below (FIG. 17/STEP 44). First, in the job decomposition module 22, the "first movement job" included in the first movement command signal is converted into a "first movement task" and recognized.

Next, the operation device 2c of the robot 2O is controlled by the task execution module 23 according to the "first movement task". Specifically, the operation device 2c is controlled such that the robot 2O moves to the vicinity of the robot 2E.

As described above, when the first movement processing is executed and the robot 2O moves to the vicinity of the robot 2E, a first movement end signal is transmitted from the robot 2O to the control platform 5 (FIG. 17/STEP 45). The first movement end signal is a signal indicating that the robot 2O has moved to the vicinity of the robot 2E.

When the control platform 5 receives the first movement end signal, the control platform 5 transmits a tea taking command signal to the robot 2E (FIG. 17/STEP 46). The tea taking command signal is a signal including the "tea taking job" described above.

When the robot 2E receives the tea taking command signal, the robot 2E executes the tea taking processing as described below (FIG. 17/STEP 47). First, in the job decomposition module 22, the "tea taking job" included in the tea taking command signal is decomposed into a "tea recognition task", a "tea gripping task", and a "tea placement task" and recognized.

Next, the task execution module 23 controls the operation device 2c of the robot 2E as described below in accordance with the "tea recognition task", the "tea gripping task", and the "tea placement task".

First, a PET bottle of "black tea" ordered by the guest is recognized by the camera of the operation device 2c. Next, the PET bottle of "black tea" is gripped by the three-finger hands of the operation device 2c and then placed on a placement place of the robot 2O by six free arms.

As described above, when the tea taking processing is executed and the PET bottle of "black tea" is placed in the placement place of the robot 2O, a tea taking end signal is transmitted from the robot 2E to the control platform 5 (FIG. 17/STEP 48). The tea taking end signal is a signal indicating that the PET bottle of "black tea" is placed in the placement place of the robot 2O.

When the control platform 5 receives the tea taking end signal, the control platform 5 transmits a second movement command signal to the robot 2O (FIG. 17/STEP 49). The second movement command signal is a signal including the "second movement job" described above.

When the robot 2O receives the second movement command signal, the robot 2O executes the second movement processing as described below (FIG. 17/STEP 50). First, in the job decomposition module 22, the "second movement job" included in the second movement command signal is converted into a "second movement task" and recognized.

Next, the operation device 2c of the robot 2O is controlled by the task execution module 23 according to the "second movement task". Specifically, the operation device 2c is controlled such that the robot 2O moves to the vicinity of the guest.

As described above, when the second movement processing is executed and the robot 2O moves to the vicinity of the guest, a second movement end signal is transmitted from the robot 2O to the control platform 5 (FIG. 17/STEP 51). The second movement end signal is a signal indicating that the robot 2O has moved to the vicinity of the guest.

When the control platform 5 receives the second movement end signal, the control platform 5 transmits an arrival notification command signal to the robot 2N (FIG. 17/STEP 52). The arrival notification command signal is a signal including the "arrival notification job" described above.

When the robot 2N receives the arrival notification command signal, the robot 2N executes the arrival notification processing as described below (FIG. 17/STEP 53). First, the "arrival notification job" included in the arrival notification command signal is converted into an "arrival notification task" and recognized by the job decomposition module 22.

Next, the operation device 2c of the robot 2N is controlled according to the "arrival notification task" by the task execution module 23. Specifically, a voice indicating that the PET bottle of "black tea" has arrived is output from the speaker of the operation device 2c to the guest.

As described above, when the arrival notification processing is executed and the voice indicating that the PET bottle of "black tea" has arrived is output to the guest, an arrival notification end signal is transmitted from the robot 2N to the control platform 5 (FIG. 17/STEP 54). The arrival notification end signal is a signal indicating that a voice notifying that the PET bottle of "black tea" has arrived has been output from the robot 2N to the guest. As described above, by controlling the three robots 2N, 2E, and 2O, the tea serving service is provided to the user.

As described above, according to the control platform 5 and the service providing system 1A of the second embodiment, when the user's request is input to the user terminal 8, the request signal indicating the request is transmitted from the user terminal 8 to the control platform 5. Accordingly, in the CI brain module 51, the request service of the user is recognized, and a list (see FIG. 16) of the robot group capable of realizing the request service is created by referring to the service recipe database 55 described above according to the request service.

Then, since the list signal representing the list of the robot group is transmitted from the control platform 5 to the user terminal 8, the user can obtain information of the robot group capable of executing the request service via the user terminal 8, and convenience of the user can be improved.

In the user terminal 8, when the communication module 80 receives the list signal, the list of the robot group in the list signal is displayed on the display 8b in an output mode recognizable by the user, and is displayed on the display 8b in a state of including data of the functional specification and the characteristic specification of each of the robots 2. Then, since the user can select one robot group from the robot groups displayed on the display 8b by operating the input device 8a, the user can select one robot group optimal for executing the request service. Thus, the convenience of the user can be still further improved.

In addition, when one robot group is selected, the operation schedule of the robot group is determined in the CI brain module 51, and each of the robots 2 of the robot group is controlled according to the operation schedule, so that the request service can be suitably provided to the user.

Since the request service of the user can be provided by controlling one robot group, that is, a combination of the plurality of robots 2, the performance and structure per robot can be simplified and the manufacturing cost can be reduced as compared with a conventional case where the service is provided by one robot. As a result, it is possible to realize sophistication of the provided service while suppressing an increase in cost.

Although the second embodiment is an example in which the user inputs the request "want to execute robot service of tea serving in office" to the user terminal 8 in STEP 30 in FIG. 15, for example, when the user inputs a request "want to perform security" to the user terminal 8 in STEP 30 in FIG. 15, the list of the robot group as illustrated in FIG. 13 is created in STEP 32 in FIG. 15.

Although the second embodiment is an example in which a server is used as the control platform 5, the control platform of the present invention is not limited thereto, and may include the communication unit, the service data storage unit, the requesting service recognition unit, and the possible effector group determination unit. For example, a distributed computing system, various resources in cloud computing, or the like may be used as the control platform.

Although the second embodiment is an example in which the plurality of robots 2 are used as a plurality of effectors, the effector of the present invention is not limited thereto, and may include those that are communicably connected to the control platform and execute different predetermined operations.

For example, as the plurality of effectors, those that execute at least one predetermined operation involving physical events such as movement, excitation, driving, blowing, light emission, sound generation, and odor generation may be used in combination. As the plurality of effectors, a locking/unlocking device that automatically performs locking/unlocking, a light emitting device, and the like may be used in combination.

On the other hand, although the second embodiment is an example in which the terminal of the personal computer type is used as the user terminal, the user terminal of the present invention is not limited thereto, and may be any user terminal that is communicably connected to the control platform and operated by the user. For example, a smartphone, a tablet PC, or the like may be used as the user terminal.

In addition, although the second embodiment is an example in which the combination of the three robots that are the effectors is used as the effector group, the effector group of the present invention is not limited thereto, and a combination of two effectors or a combination of four or more effectors may be used as the effector group.

Hereinafter, a control platform according to a third embodiment of the present invention will be described. The control platform of the present embodiment is applied to a service providing system 1B illustrated in FIG. 18, and the service providing system 1B provides a robot service by a robot to a user thereof (hereinafter referred to as "user") or the like.

Figure 18:
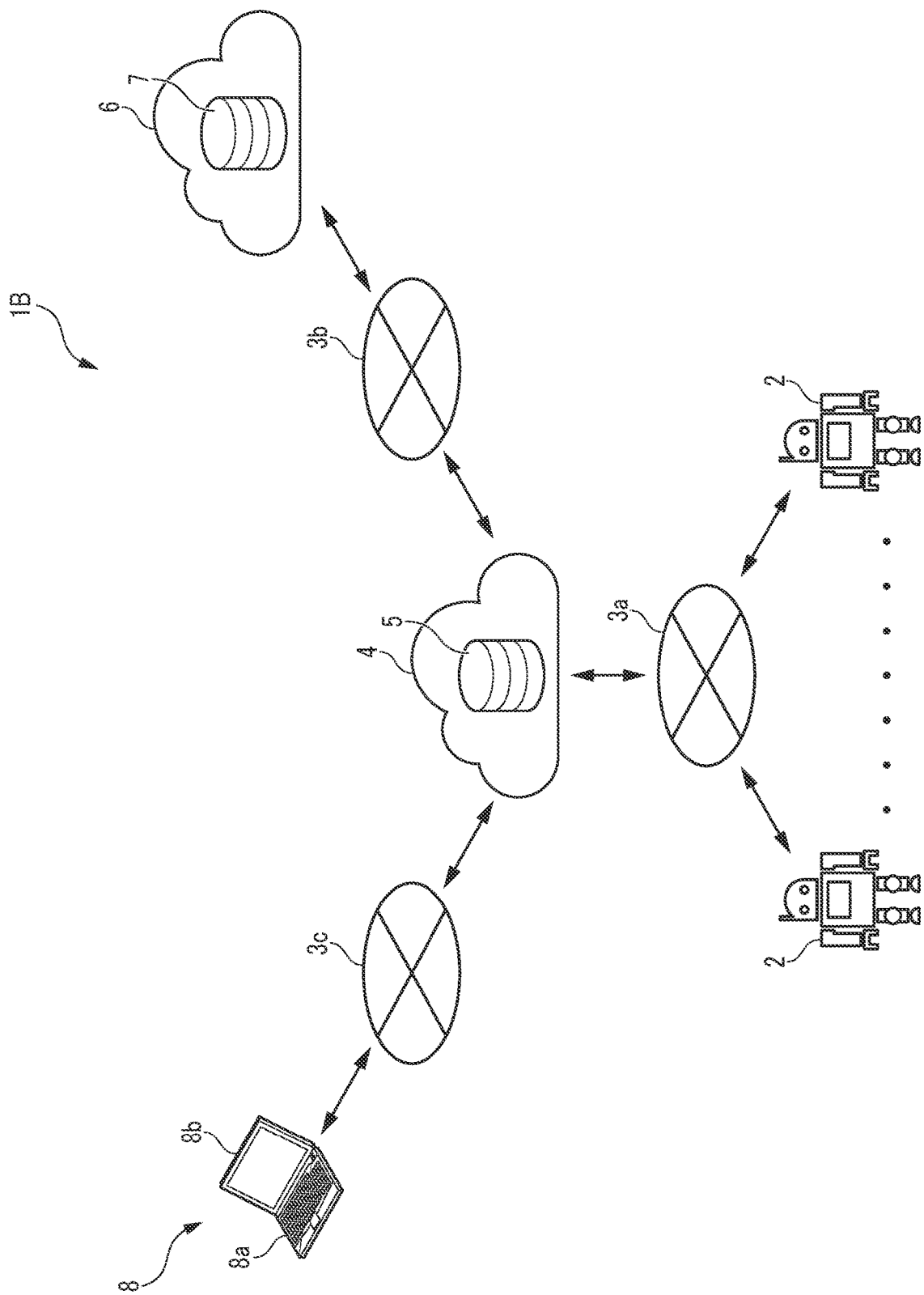
FIG. 18 is a diagram schematically illustrating a configuration of a control platform and a service providing system according to a third embodiment of the present invention.

As illustrated in FIG. 18, similarly to the service providing system 1A of the second embodiment, the service providing system 1B includes a large number of robots 2 (only two are illustrated), a control platform 5, a client server 7, a plurality of user terminals 8 (only one is illustrated), and the like.

Figure 19:
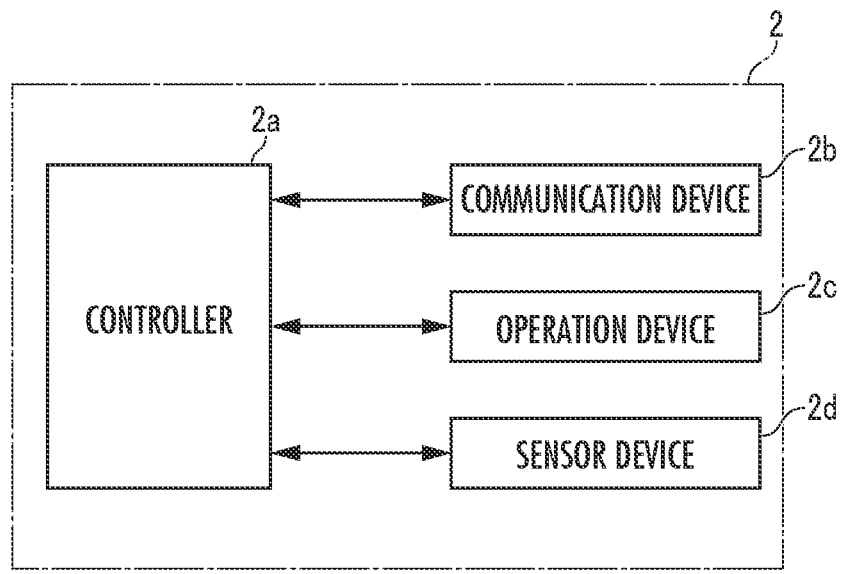
FIG. 19 is a block diagram illustrating an electrical configuration of the robot.

First, each of the large number of robots 2 will be described. Each of the robots 2 is configured to be autonomously movable, and includes a controller 2a, a communication device 2b, an operation device 2c, a sensor device 2d, and the like as illustrated in FIG. 19. In the present embodiment, the robot 2 corresponds to a movable item and an effector.

The controller 2a is used for controlling the communication device 2b and the operation device 2c, and includes a computer including a processor, a storage, an I/O interface (all not illustrated), and the like. The controller 2a has an AI learning function, and an operation characteristic of each of the robots 2 is formed by the AI learning function during operation of each of the robots 2.

The communication device 2b is connected to the control platform 5 in cloud computing (hereinafter referred to as "cloud") 4 via a communication network 3a that is a wireless communication network, and is thereby configured to be capable of wireless communication with the control platform 5.

In the communication device 2b, one SIM card (not illustrated) that is contracted with a communication company is built in, and the SIM card is contracted with the communication company with one identification number.

Thus, the communication device 2b executes wireless communication with the control platform 5 using this identification number as identification information.

The operation device 2c is a device for executing various operations, and specifically includes at least one device of a six-degree-of-freedom arm, a three-finger hand, a speaker, and the like, a moving device for autonomously moving the robot 2, and the like.

In addition, the sensor device 2d is used for acquiring surrounding environment information of the robot 2 and operating environment information such as a moving speed and a current position, and specifically includes a camera, a gyro sensor, a GPS (all not illustrated), and the like.

Although FIG. 18 illustrates humanoid robots as the large number of robots 2, the large number of robots 2 of the present embodiment have a simpler structure (not illustrated) than the humanoid robot, and include a robot of a type that executes a single predetermined operation and a robot of a type that executes a plurality of predetermined operations.

In the present embodiment, the plurality of the robot groups are provided regarding the robot group, including the plurality of robots 2 of the large number of robots 2, as one. Each of the plurality of robot groups is configured to execute a predetermined service by execution of different predetermined operations by the plurality of robots 2.

Figure 20:
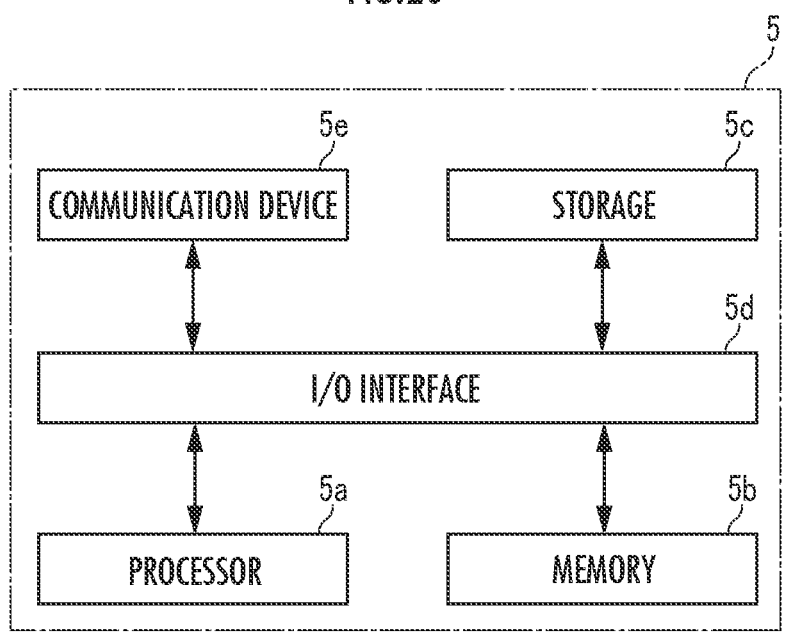
FIG. 20 is a block diagram illustrating an electrical configuration of the control platform.

On the other hand, the control platform 5 executes control of the robot group and the like, and specifically includes a server. As illustrated in FIG. 20, the control platform 5 includes a processor 5a, a memory 5b, a storage 5c, an I/O interface 5d, a communication device 5e, and the like. The memory 5b includes a RAM, an E2PROM, a ROM, and the like, and stores a database in which the specification of each of the robots 2 is described and the like therein.

As described above, the communication device 5e is connected to the robot 2 described above via the communication network 3a, and is connected to the client server 7 and the user terminal 8 in a cloud 6 via communication networks 3b and 3c. Both of these communication networks 3b and 3c are configured by the Internet.

With the above configuration, the control platform 5 is configured to be able to intercommunicate with the robot 2, the client server 7, and the user terminal 8 via the communication device 5e. The client server 7 stores various data in the control platform 5.

In addition, each of the plurality of user terminals 8 is configured by a personal computer, and includes an input device 8a, a display 8b, a communication device (not illustrated), and the like. The input device 8a includes a keyboard, a mouse, and the like. In the present embodiment, the user terminal 8 corresponds to an external device.

In the user terminal 8, data transmission and reception with respect to the control platform 5 is executed via the communication device according to operation of the input device 8a by the user. In the case of the user terminal 8, it is configured that when the user desires to use the robot service, the user can select one robot group from the plurality of robot groups capable of executing a desired service by executing the operation of data transmission and reception with respect to the control platform 5 by operation of the user terminal 8.

When the user desires to refer to a degree-of-congestion map and degree-of-congestion data described below, the degree-of-congestion map and the degree-of-congestion data are displayed on the display 8b by operation of the user terminal 8.

Figure 21:
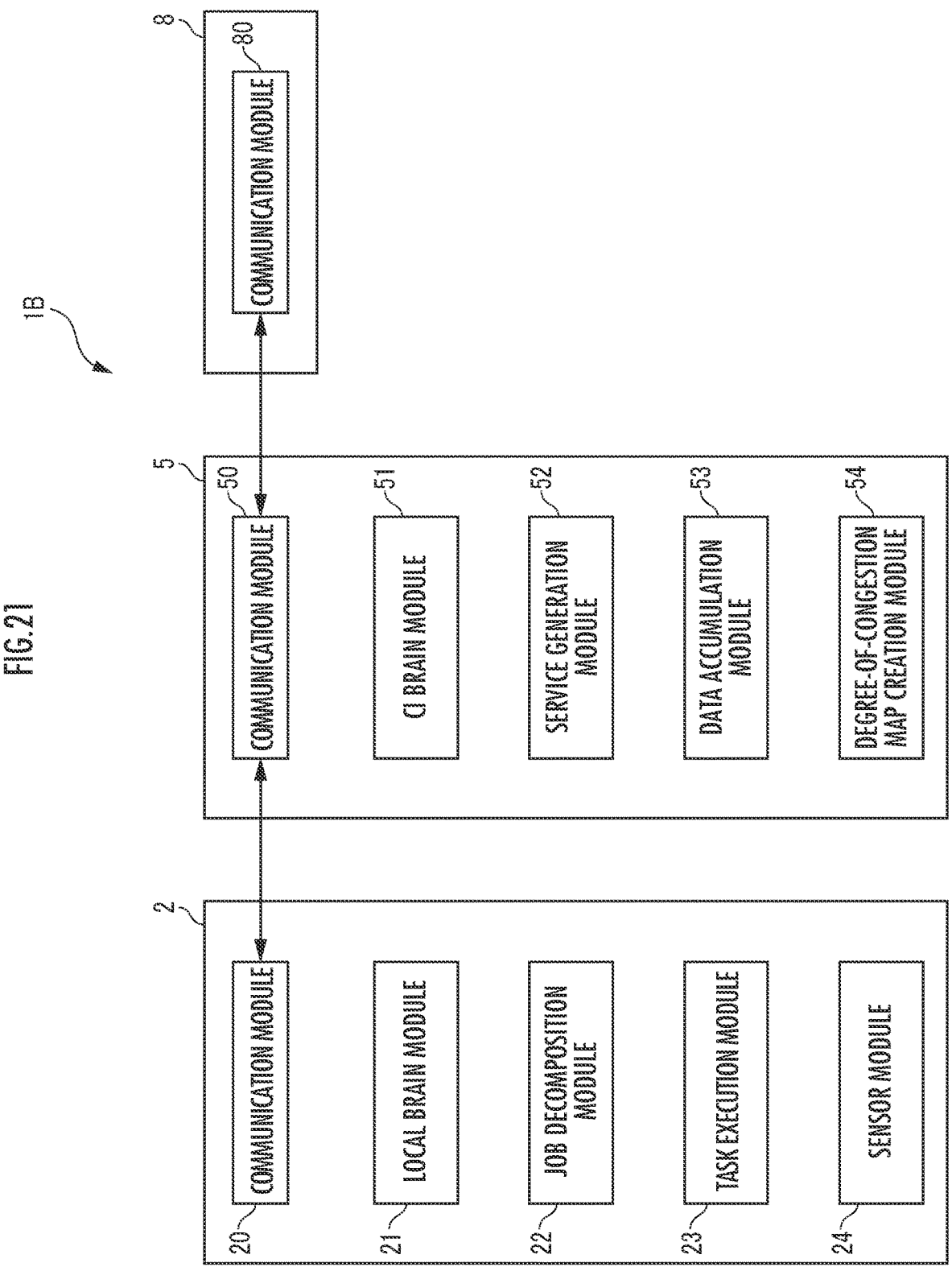
FIG. 21 is a block diagram illustrating functional configurations of the robot, the control platform, and a user terminal in the service providing system of the third embodiment.

Next, functional configurations of the robot 2, the control platform 5, and the user terminal 8 in the service providing system 1B of the third embodiment will be described with reference to FIG. 21. First, the functional configuration of the user terminal 8 will be described. The user terminal 8 includes a communication module 80, and the communication module 80 is specifically configured by the above-described communication device.

The communication module 80 has a function of executing communication with a communication module 50 described below of the control platform 5. In the user terminal 8, the service builder or the user can access the control platform 5 via the two communication modules 80 and 50 by operating the input device 8a described above.

Next, the functional configuration of the control platform 5 will be described. As illustrated in FIG. 21, the control platform 5 includes the communication module 50, a CI brain module 51, a service generation module 52, a data accumulation module 53, and a degree-of-congestion map creation module 54.

In the present embodiment, the communication module 50 corresponds to a transmission unit, the CI brain module 51 corresponds to a data acquisition unit, the data accumulation module 53 corresponds to a storage unit, and the degree-of-congestion map creation module 54 corresponds to a low speed position data selection unit, a degree-of-congestion parameter calculation unit, and a display data creation unit.

The communication module 50 is specifically configured by the above-described communication device 5e. The communication module 50 has a function of executing communication with the communication module 80 of the user terminal 8 described above and a communication module 20 described below of the robot 2 when the communication module 50 controls the robot group.

In the communication module 50, a map signal including the degree-of-congestion map and the degree-of-congestion data is transmitted to the communication module 80 of the user terminal 8 during execution of degree-of-congestion transmission processing described below. Accordingly, the user of the user terminal 8 can visually recognize the degree-of-congestion map and the degree-of-congestion data on the display 8b. In addition, when the communication module 50 receives an information data signal described below from the communication module 20, the communication module 50 outputs the information data signal to the CI brain module 51.

The three modules 51 to 54 specifically include the above-described processor 5a, memory 5b, and storage 5c, and the CI brain module 51 has a plurality of functions as described below.

First, the CI brain module 51 has a function of recognizing the service desired by the user through communication with the user terminal 8, searching for the robot group capable of executing the service by accessing the service generation module 52 and referring to the database, and transmitting the search result to the user terminal 8.

When the robot group that executes the service is selected by the user, the CI brain module 51 has a function of decomposing the service into a plurality of jobs and assigning each of the plurality of jobs to each of the plurality of robots 2 in the robot group.

The CI brain module 51 has a function of determining a schedule for transmitting a command signal including the job to each of the robots 2 so that each of the robots 2 can suitably execute the job assigned as described above.

In addition, when the information data signal is input from the communication module 50, the CI brain module 51 outputs, to the data accumulation module 53, information data such as operation information of each of the robots 2 included in the information data signal, execution information (such as a time and the number of times) of each service, and operation environment information (such as moving speed and current position) of each of the robots 2.

On the other hand, the service generation module 52 has a function of storing data of the plurality of robot groups provided in the service providing system 1B, the link data in which the service executable by the plurality of robot groups and the plurality of robot groups are linked, and the like.

The service generation module 52 has a function of enabling the user to edit the link data, the data of the plurality of robot groups, and the like by accessing the service generation module 52 via the user terminal 8. In addition, the service generation module 52 has a function of monitoring the plurality of robot groups.

In addition, the data accumulation module 53 has a function of storing and accumulating the information data when the information data is input from the CI brain module 51, and a function of storing and accumulating the degree-of-congestion map (see FIG. 28) and the degree-of-congestion data (see FIG. 27) created by the degree-of-congestion map creation module 54.

On the other hand, the degree-of-congestion map creation module 54 has a function of creating the degree-of-congestion map on a movement path of each of the robots 2 based on the information data of each of the robots 2 stored in the data accumulation module 53. A specific method of creating the degree-of-congestion map will be described below.

Next, the functional configuration of the robot 2 will be described. As illustrated in FIG. 21, the robot 2 includes a communication module 20, a local brain module 21, a job decomposition module 22, a task execution module 23, and a sensor module 24.

The communication module 20 is specifically configured by the above-described communication device 2b. As will be described below, the communication module 20 has a function of executing communication with the above-described communication module 50 of the control platform 5 when the robot 2 is controlled by the control platform 5.

The three modules 21 to 23 are specifically configured by the controller 2a described above. The local brain module 21 has a function of outputting a job in a job data signal to the job decomposition module 22 when the local brain module 21 receives the job data signal from the control platform 5.

On the other hand, the job decomposition module 22 stores link data defining a relationship between the job and the task, and has a function of decomposing the job from the local brain module 21 into a plurality of the tasks for recognition, converting the job into the single task for recognition, and outputting the plurality of tasks or the single task to the local brain module 21.

The local brain module 21 further includes a function of outputting the plurality of tasks or the single task from the job decomposition module 22 to the task execution module 23.

On the other hand, the task execution module 23 has a function of controlling the operation device 2c of the robot 2 according to the plurality of tasks or the single task from the local brain module 21.

In addition, the sensor module 24 specifically includes a sensor device 2d, and has a function of acquiring the task information indicating the task execution state by the operation device 2c, the surrounding environment information of the robot 2, and the operation environment information such as the moving speed and the current position, and outputting these pieces of information to the local brain module 21.

The local brain module 21 has a function of transmitting the information data signal including the task information, the operation environment information, and the operation environment information from the sensor module 24 to the control platform 5 via the communication module 20.

Next, a specific method of creating the degree-of-congestion map and the principle thereof in the degree-of-congestion map creation module 54 of the control platform 5 will be described. In the service providing system 1B configured as described above, when one robot group capable of executing the robot service desired by the user is selected, each of the robots 2 in one robot group individually moves in a predetermined region where the service is provided in order to provide the robot service.

Figure 22:
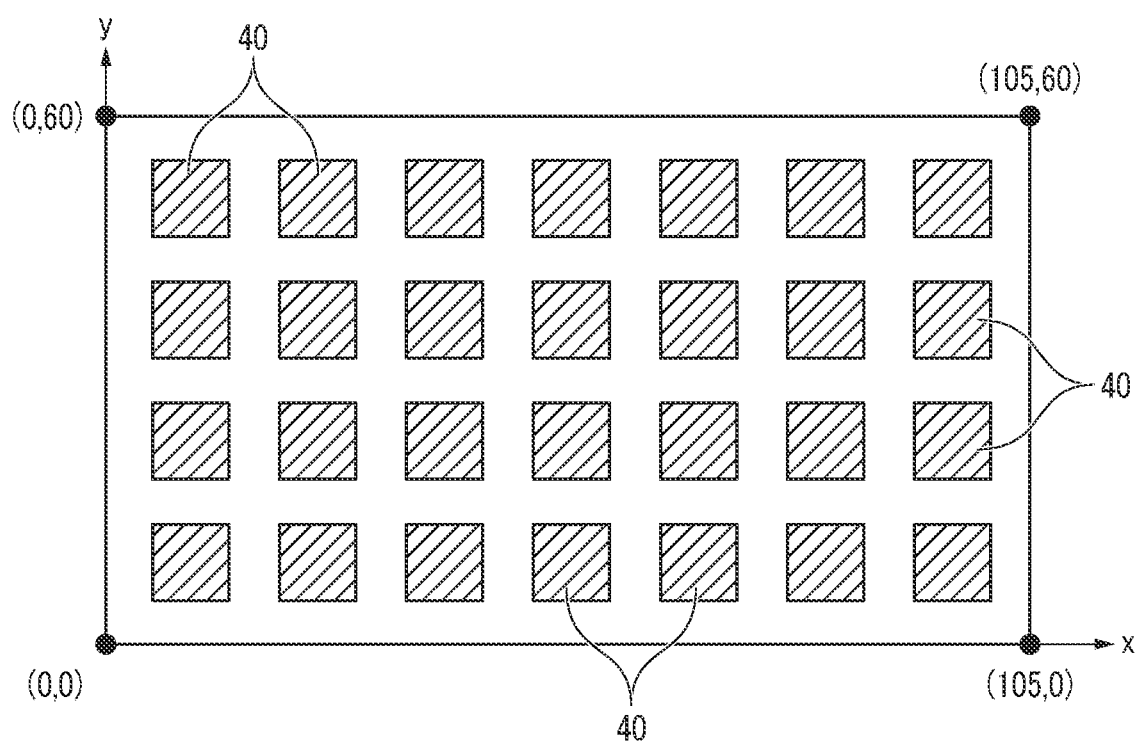
FIG. 22 is a plan view illustrating a predetermined region for providing the robot service.

In the following description, a predetermined region where each of the robots 2 moves is assumed to be a rectangular region in plan view as illustrated in FIG. 22. In the plan view 22 of the predetermined region, a rectangular element 40 indicated by hatching represents a building, and the other region represents a passage through which the robot 2 can move.

The position of the robot 2 in the predetermined region is set to a center point (reference portion) of a circle when an outer shape of the robot 2 is simulated in a circular shape and projected on the predetermined region in FIG. 22, and is represented by an x coordinate value and a y coordinate value of an orthogonal coordinate system.

In addition, the robot 2 assumes that a moving speed V of the robot 2 can be changed between a value 0 and a maximum speed Vmax, and divides a region of the moving speed V, that is, a speed range into three regions: a low speed range, a medium speed range, and a high speed range. In this case, when V1 and V2 are predetermined values of the moving speed V satisfying 0<V1<V2<Vmax, the low speed range is set as a region of 0≤V<V1, the medium speed range is set as a region of V1≤V<V2, and the high speed range is set as a region of V2≤V≤Vmax.

When the moving speed V, the position, and a time stamp of the robot 2 are acquired at a predetermined cycle (1 sec in the present embodiment), for example, it is assumed that data illustrated in FIG. 23 is obtained in two robots 2R and 2S.

Figure 24:
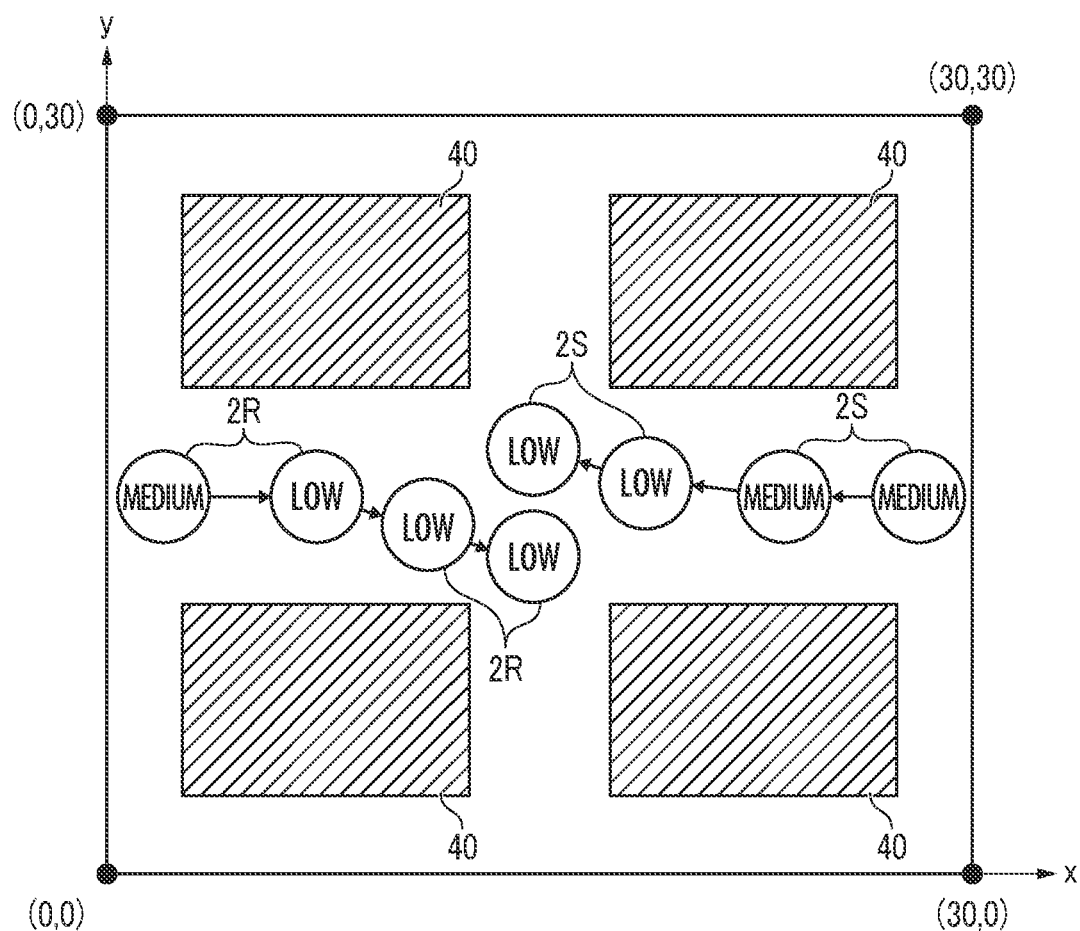
FIG. 24 is a plan view in which transition of movement of the two robots is plotted.

When the outer shapes of the two robots 2R and 2S are simulated in a circular shape as described above and transitions of the positions and speed ranges of the robots 2R and 2S are plotted on a plan view, results illustrated in FIG. 24 are obtained. In data plotted by the circle of the robots 2R and 2S illustrated in FIG. 24, characters "low" and "medium" in the circle of the data indicate the position data in the low speed range and the position data in the medium speed range, respectively. Hereinafter, the position data in the low speed range is referred to as "low speed position data", and the circle of the outer shape of the low speed position data is referred to as "data circle".

Figure 25:
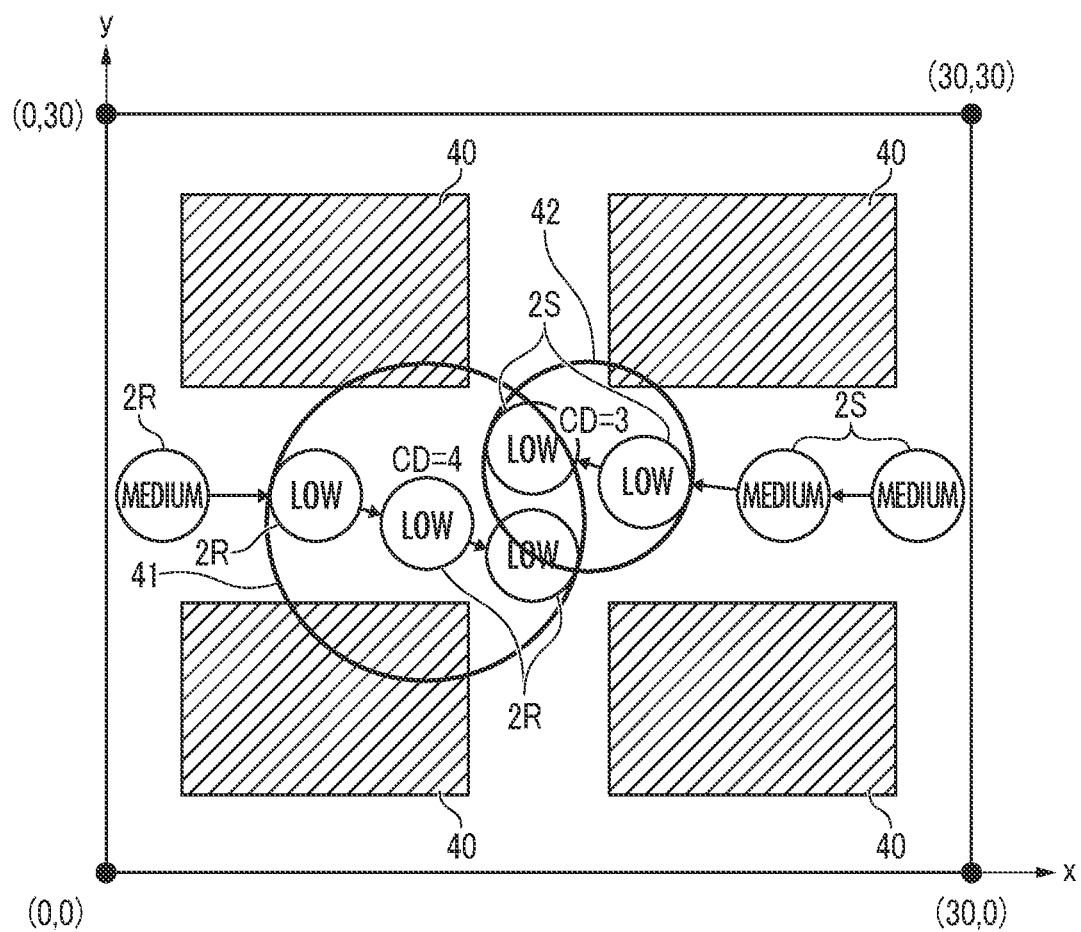
FIG. 25 is a diagram in which an area circle is drawn on FIG. 24.

In the low speed position data of the robot 2R in FIG. 24, when a circle circumscribing two data circles that are most spaced apart from each other is drawn, a circle 41 as illustrated in FIG. 25 is obtained. The circle 41 indicates an area, and is therefore hereinafter referred to as "area circle 41". The same applies to the following area circle 42. In addition, the low speed position data of the robot 2S in FIG. 24, when a circle circumscribing two data circles that are most spaced apart from each other is drawn, the circle 42 as illustrated in FIG. 25 is obtained.

Then, when the number of data in which at least a part of the data circle exists in the area circle 41 is counted in the low speed position data of the robots 2R and 2S, this number of data is calculated as a degree of congestion CD in an area within the area circle 41. That is, in the example of FIG. 25, the degree of congestion CD in the area within the area circle 41 is CD=4.

In addition, when the number of data in which at least a part of the data circle exists in the area circle 42 is counted in the low speed position data of the robots 2R and 2S, this number of data is calculated as the degree of congestion CD in an area within the area circle 42. That is, in the example of FIG. 25, the degree of congestion CD in the area within the area circle 42 is CD=3. In the present embodiment, the degree of congestion CD corresponds to the degree-of-congestion parameter.

As illustrated in FIG. 25, since the area circle 41 and the area circle 42 partially overlap each other, the two overlapping areas are regarded as one area, and the low speed position data of the two robots 2R and 2S are regarded as a set of data. In the low speed position data of the two robots 2R and 2S, when a circle circumscribing two data circles that are most spaced apart from each other is drawn, a circle 43 as illustrated in FIG. 26 is obtained.

Figure 26:
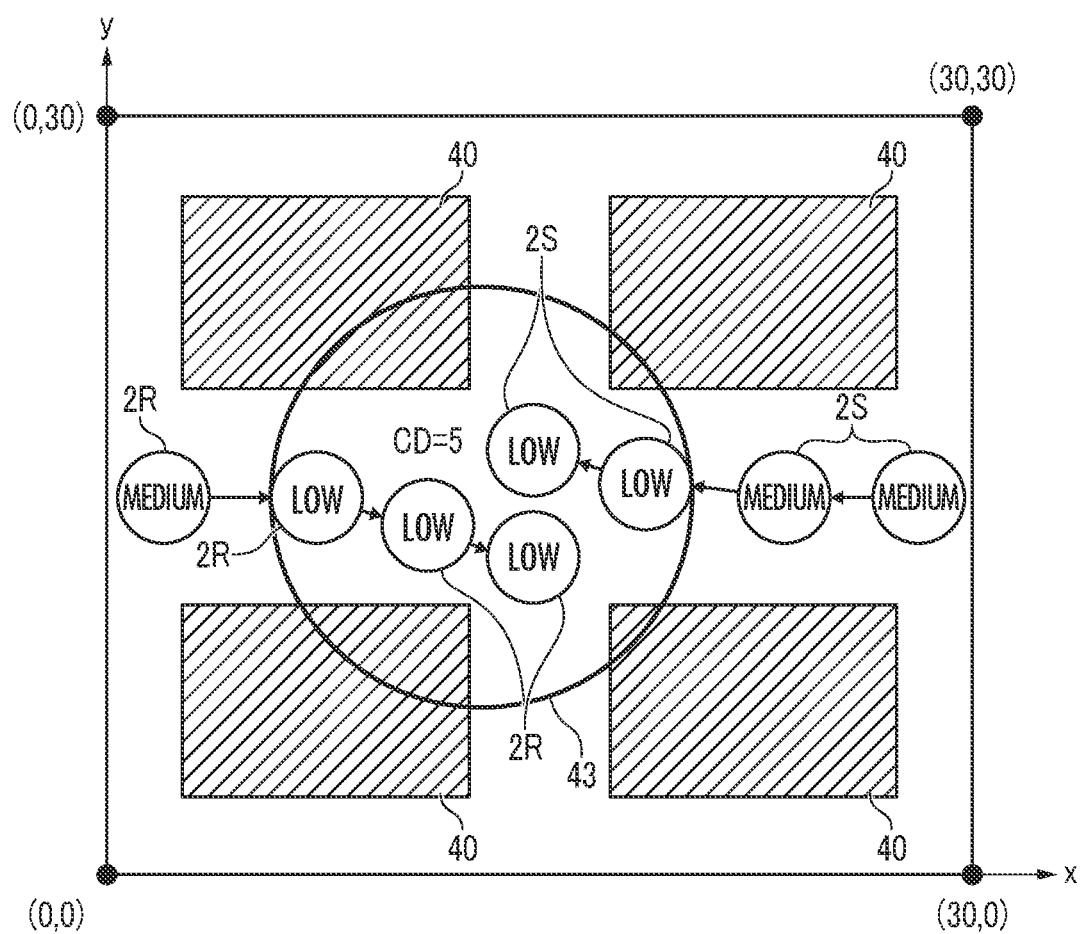
FIG. 26 is a diagram in which movement data of the two robots in FIG. 24 is regarded as one set and the area circle is drawn.

As illustrated in FIG. 26, three pieces of low speed position data of the robot 2R and two pieces of low speed position data of the robot 2S exist in the area circle 43, and therefore, the degree of congestion CD in the area circle 43 is CD=5. In the third embodiment, the degree of congestion CD is calculated by the above calculation method.

FIG. 27 illustrates an example of the degree-of-congestion data in a case where the degrees of congestion CD at all locations in a predetermined region are calculated by the above calculation method. This degree-of-congestion data indicates that congestion has occurred between 9:30:30 and 33 seconds, and when this degree-of-congestion data is plotted on the plan view of FIG. 22, the degree-of-congestion map as illustrated in FIG. 28 is created.

Figure 28:
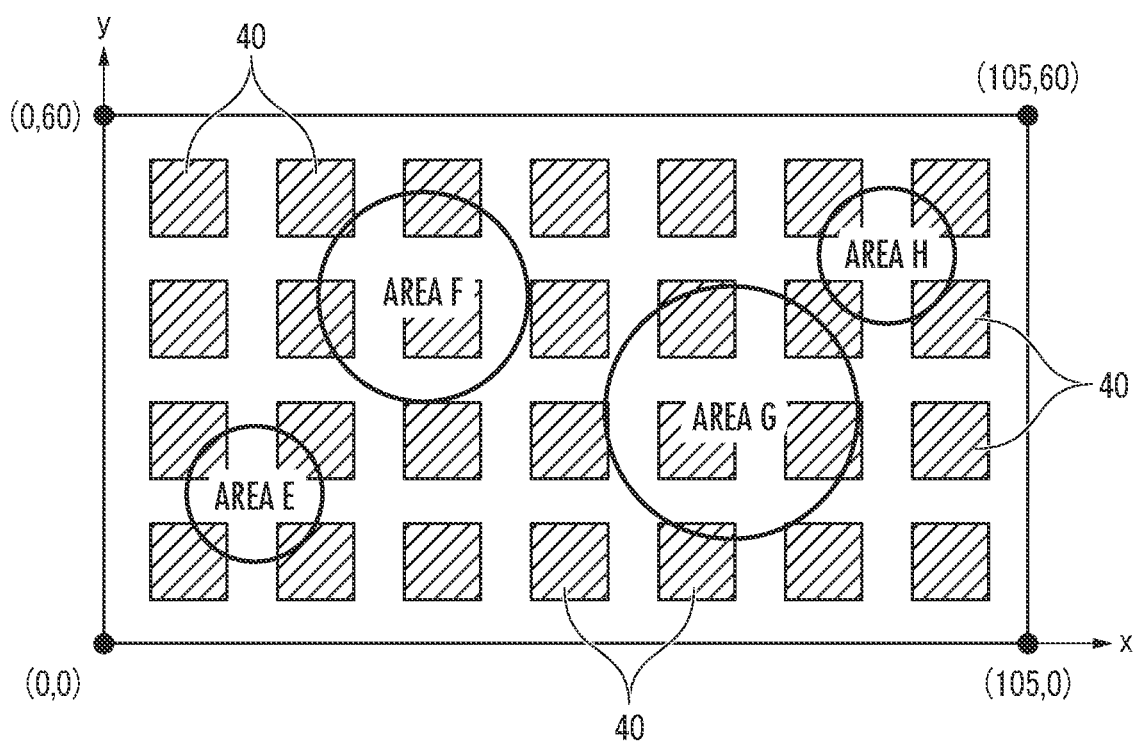
FIG. 28 is a diagram illustrating a degree-of-congestion map.

In the degree-of-congestion map illustrated in FIG. 28, the degree of congestion CD is not displayed in the area circle; however, in an actual degree-of-congestion map, the degree of congestion CD is displayed in the area circle. Therefore, when referring to the degree-of-congestion map, it is possible to easily visually recognize an area where congestion of the robot 2 occurs and the degree of congestion in the area. In the degree-of-congestion map creation module 54 of the third embodiment, the degree-of-congestion map and the degree-of-congestion data are created as described above.

Next, degree-of-congestion calculation processing will be described with reference to FIG. 29. The degree-of-congestion calculation processing calculates the degree-of-congestion data by the above-described method, creates the degree-of-congestion map, and stores the degree-of-congestion data and the degree-of-congestion map in the memory 5b of the control platform 5, and is executed by the control platform 5 at the above-described predetermined cycle.

Figure 29:
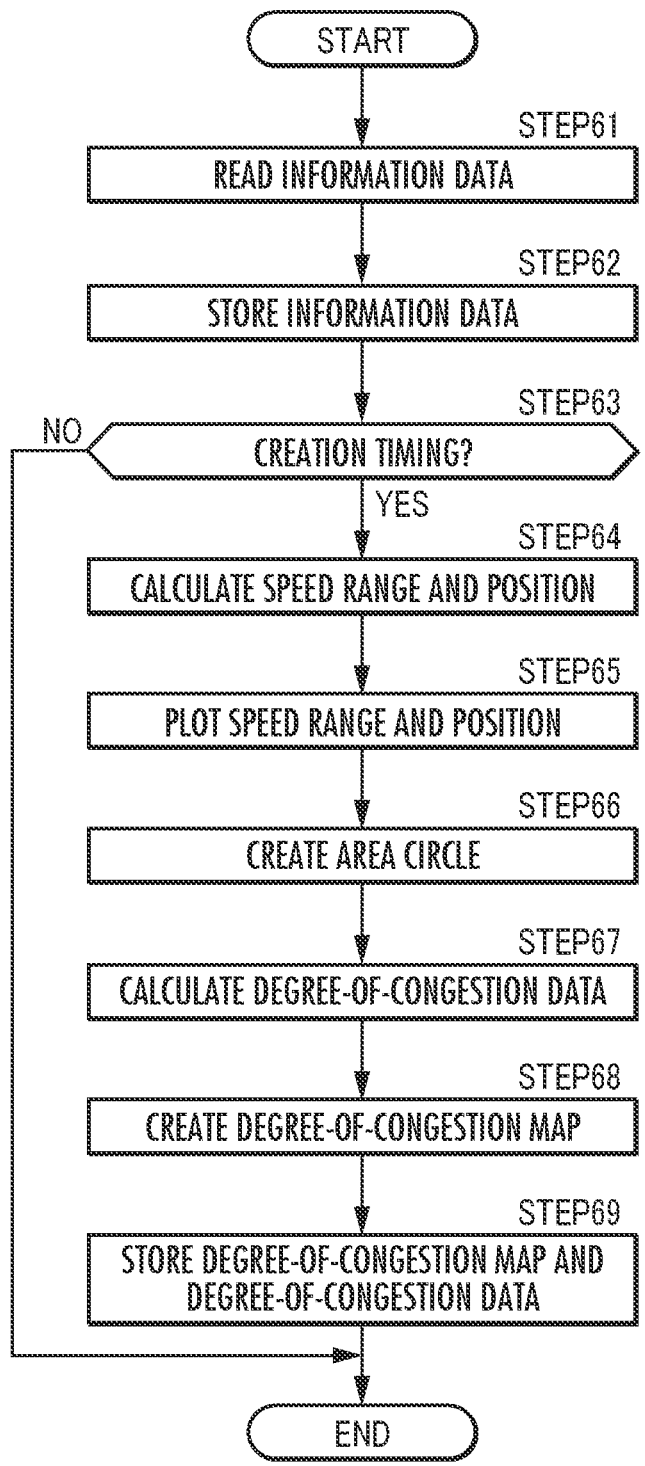
FIG. 29 is a flowchart illustrating degree-of-congestion calculation processing.

As illustrated in FIG. 29, first, information data included in information data signals received from all the robots 2 in operation is read (FIG. 29/STEP 61). As described above, the information data includes the moving speed and the current position of the robot 2.

Next, the information data is stored in the memory 5b (FIG. 29/STEP 62).

Next, it is determined whether it is a creation timing of the degree-of-congestion map (FIG. 29/STEP 63). In this case, when a predetermined time has elapsed from a control timing at which the previous degree-of-congestion map has been created, it is determined that it is the creation timing of the degree-of-congestion map, and otherwise, it is determined that it is not the creation timing of the degree-of-congestion map.

When the determination is negative (FIG. 29/STEP 63 . . . NO) and it is not the creation timing of the degree-of-congestion map, the processing ends as it is.

On the other hand, when the determination is affirmative (FIG. 29/STEP 63 . . . YES) and it is the creation timing of the degree-of-congestion map, the speed range, the position, and the like of each of the robots 2 are calculated based on the information data in the memory 5b (FIG. 29/STEP 64). That is, the above-described data (time stamp, position, and speed range) as illustrated in FIG. 23 is calculated for each of the robots 2.

Next, the calculation results of the speed range and the position of each of the robots 2 are plotted in a two-dimensional coordinate system as illustrated in FIG. 24 described above (FIG. 29/STEP 65).

Next, an area circle is created by the above-described method (FIG. 29/STEP 66). In this case, as described above, when the area circles of the plurality of robots 2 overlap each other when the area circle of each of the robots 2 is created (for example, in the state illustrated in FIG. 25), one area circle is created by regarding the low speed position data of the plurality of robots 2 as a set of one data.

As described above, after the area circle is created, the degree-of-congestion data is calculated (FIG. 29/STEP 67). In this case, specifically, various types of data illustrated in FIG. 27 described above are calculated as the degree-of-congestion data.

Next, a degree-of-congestion map is created (FIG. 29/STEP 68). In this case, the degree-of-congestion map is created as illustrated in FIG. 28 described above, for example, and is created so that the degree of congestion CD is displayed in each area circle in FIG. 28.

Next, the degree-of-congestion map and the degree-of-congestion data created as described above are stored in the memory 5b (FIG. 29/STEP 69). Then, this processing ends.

Next, degree-of-congestion transmission processing will be described with reference to FIG. 30. The degree-of-congestion transmission processing reads the degree-of-congestion map and the degree-of-congestion data in the memory 5b of the control platform 5, transmits the degree-of-congestion map and the degree-of-congestion data to the user terminal 8, and is executed by the control platform 5 at a predetermined control cycle.

Figure 30:
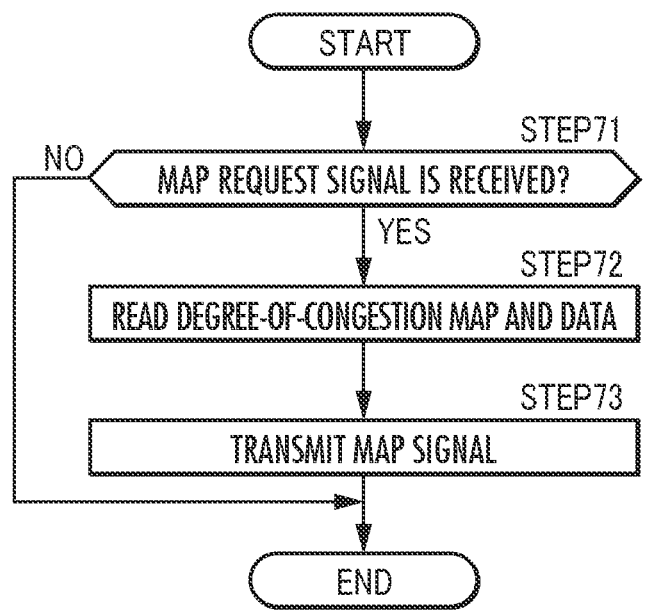
FIG. 30 is a flowchart illustrating degree-of-congestion transmission processing.

As illustrated in FIG. 30, first, it is determined whether a map request signal has been received from the user terminal 8 (FIG. 30/STEP 71). The map request signal is a signal for requesting the degree-of-congestion map, and is transmitted from the user terminal 8 to the control platform 5 when the user terminal 8 is operated by the user.

When the determination is negative (FIG. 30/STEP 71 . . . NO), the processing ends as it is. On the other hand, when the determination is affirmative (FIG. 30/STEP 71 . . . YES) and the map request signal is received from the user terminal 8, the degree-of-congestion map and the degree-of-congestion data are read from the memory 5b (FIG. 30/STEP 72).

Next, the map signal including the degree-of-congestion map and the degree-of-congestion data is transmitted to the user terminal 8 (FIG. 30/STEP 73). Then, this processing ends.

When the map signal transmitted from the control platform 5 is received by the user terminal 8 as described above, the degree-of-congestion map included in the map signal is displayed on the display 8b in the user terminal 8. Accordingly, the user can refer to the degree of congestion of the robot 2 in a predetermined region on the display 8*b*.

As described above, according to the control platform 5 of the third embodiment, the moving speed and the position of each of the robots 2 in the predetermined region are acquired as information data at a predetermined cycle and stored in the memory 5*b*. When the degree-of-congestion map is created, first, the information data within a predetermined period of each of the robots 2 is read from the memory 5*b*, and the speed range and the position are plotted on two-dimensional coordinates. At this time, the position of each of the robots 2 is set to the center position of each of the robots 2 when the outer shape of each of the robots 2 is simulatively defined as a circle and projected on two-dimensional coordinates.

Next, among the low speed position data, an area circle whose maximum length is a length between two points where a straight line passing through two pieces of the low speed position data most spaced apart from each other and extending outward from the two pieces of low speed position data intersects the outer shapes of each of the robots 2 corresponding to the two pieces of low speed position data is created.

At this time, when the area circles of the plurality of robots 2 overlap each other, the low speed position data of the plurality of robots 2 is regarded as one data set, and an area circle in one data set is created. Then, the number of data in which at least a part of the low speed position data is located within the area circle is acquired as the degree of congestion CD.

In this case, since each of the robots 2 autonomously moves, it can be estimated that the movement path is congested when the robot 2 moves at a low speed. In addition, the maximum length of the area circle is the length between two points where the straight line passing through the two pieces of low speed position data most spaced apart from each other and extending outward from the two pieces of low speed position data intersects the outer shapes of each robots 2 corresponding to the two pieces of low speed position data.

Therefore, it can be estimated that the number of low speed position data in which at least a part of which is located in the area circle accurately represents the degree of congestion on the movement path of each of the robots 2 around the area circle within a predetermined period. That is, the degree of congestion CD can be calculated as a value accurately representing the degree of congestion on the movement path of each of the robots 2.

Since the outer shape of each of the robots 2 is simulatively defined as a circle, the maximum length can be calculated more easily, and an area circle can also be created easily. This makes it possible to easily calculate the degree of congestion CD.

In addition, when the area circles of the plurality of robots 2 overlap each other when the area circle of each of the robots 2 is created, one area circle is created by regarding the low speed position data of the plurality of robots 2 as a set of one data, so that the degree of congestion CD can be calculated as a value suitably representing the degrees of congestion of the two or more robots 2.

When there is a request for reference to the degree-of-congestion map and the degree-of-congestion data from the user via the user terminal 8, the map signal including the degree-of-congestion map and the degree-of-congestion data is transmitted to the user terminal 8 and displayed on the display 8*b* of the user terminal 8, so that the user can easily visually recognize the degree of congestion of the robot 2 in a predetermined region.

Although the third embodiment is an example in which a server is used as the control platform, the control platform of the present invention is not limited thereto, and may be any platform as long as it executes wireless communication with each of a plurality of the movable items via a wireless communication network and controls each movable item. For example, a personal computer may be used as the control platform.

Although the third embodiment is an example in which the orthogonal coordinate system is used as the two-dimensional coordinate system, instead of the orthogonal coordinate system, a polar coordinate system may be used as the two-dimensional coordinate system.

In addition, although the third embodiment is an example in which the robot 2 is used as the movable item, the movable item of the present invention is not limited thereto, and may be any mobile body as long as the movable item can autonomously move and has a reduced moving speed when an obstacle is present in a moving direction. For example, a humanoid robot or a robot of automatic driving vehicle type may be used as the movable item.

On the other hand, although the third embodiment is an example in which the plurality of robots 2 are used as the plurality of effectors, the plurality of effectors of the present invention are not limited thereto, and may be any effectors as long as they cooperate with each other to provide a service. For example, a plurality of humanoid robots or a plurality of robots of automatic driving vehicle type may be used as the plurality of effectors.

Although the third embodiment is an example in which the outer shape of the robot 2 as the movable item is simulated in a circular shape and projected on the two-dimensional coordinates, instead of the circular shape, the outer shape of the movable item may be simulated in an elliptical shape or a regular polygon and projected on the two-dimensional coordinates.

In addition, although the third embodiment is an example in which the reference portion of the movable item is the center point of the circle projected on the two-dimensional coordinates, instead of this, the reference portion of the movable item may be set to a portion other than the center point of the circle, for example, an end of the circle.

On the other hand, although the third embodiment is an example in which a circle is used as the closed curve, the closed curve of the present invention is not limited thereto, and may include outer ends of the outer shapes of two movable items corresponding to the two pieces of low speed position data that are most spaced apart from each other. For example, an elliptical shape, a polygon, or a regular polygon may be used as the closed curve.

Although the third embodiment is an example in which a circle is used as the two-dimensional figure, the two-dimensional figure of the present invention is not limited the circle, and may be any figure as long as a distance between the low speed position data is a maximum length. For example, an elliptical shape, a polygon, or a regular polygon may be used as the two-dimensional figure.

In addition, although the third embodiment is an example in which the degree of congestion CD is used as the degree-of-congestion parameter, the degree-of-congestion parameter of the present invention is not limited thereto, and may be any parameter as long as it represents the degree of congestion on the movement path of each movable item. For example, in the embodiment, in the low speed position data of the robots 2R and 2S, data in which at least a part of the data circle exists in the circumscribed circle 41 or 42 is counted as the value 1; however, data in which an area of the data circle existing in the circumscribed circle 41 or 42 is half or less may be counted as a value 0.5.

On the other hand, although the third embodiment is an example in which the degree of congestion CD, the area radius, and the like are described in the degree-of-congestion data, in addition to these, individual information (size, shape, and the like) of the robot 2 may be added to the degree-of-congestion data. With this configuration, it is possible to estimate cause of congestion caused by the size or shape of the robot 2.

For example, when a hem of the robot 2 has a wide shape, it can be estimated that congestion has occurred because another robot cannot pass by the side due to the shape. When an arm of the robot is long, it can be estimated that congestion has occurred because the other robot needs to reduce the moving speed although the other robot can passes through the side.

Although the third embodiment is an example in which the low speed position data of the two robots are regarded as one set data when the area circles overlap each other, the method of clustering the low speed position data is not limited thereto, and any method may be used as long as the degree of congestion CD can be suitably calculated. For example, even when the area circles overlap each other, as illustrated in FIG. 25, the degree of congestion CD corresponding to each area circle may be calculated and displayed.

REFERENCE SIGNS LIST

1 Control system
1A Service providing system
1B Service providing system
2 Robot (effector, movable item)
2X Greeting robot (effector)
2Y Tea taking robot (effector)
2Z Transfer robot (effector)
20 Communication module (effector receiving unit)
22 Job decomposition module (third task recognition unit)
23 Task execution module (operation executing unit)
3a Communication network (first communication network)
3c Communication network (second communication network)
5 Control platform
50 Communication module (communication unit, transmission unit)
51 CI brain module (first task recognition unit, effector group recognition unit, task assignment unit, service data storage unit, requesting service recognition unit, possible effector group determination unit, schedule determination unit, data acquisition unit)
52 Service generation module (storage unit)
53 Data accumulation module (storage unit)
54 Degree-of-congestion map creation module (low speed position data selection unit, degree-of-congestion parameter calculation unit, and display data creation unit)
8 User terminal (external device)
8a Input device (input interface)
8b Display (output interface)
80 Communication module (terminal-side communication unit)
CD Degree of congestion (degree-of-congestion parameter)

The invention claimed is:

1. A service providing system comprising:
a control platform;
a plurality of effectors that execute different predetermined operations;
a user terminal operated by a user; and
a control program in which the plurality of effectors and the user terminal are communicably connected and which controls the plurality of effectors in order to provide a service,
wherein
the plurality of effectors operate as: (i) a plurality of robots; (ii) devices communicably connected to the control platform to execute different predetermined operations; (iii) devices that execute at least one predetermined operation based on physical events including movement, excitation, driving, blowing, light emission, sound generation and odor generation; or (iv) a combination of a locking/unlocking device that automatically performs locking/unlocking and a light emitting device,
the control platform comprising:
a communication unit that executes communication between the plurality of effectors and the user terminal;
a service data storage unit that stores service data defining a relationship between a plurality of effector groups and a service executable by the plurality of effector groups when a combination of the plurality of effectors is one effector group;
a requesting service recognition unit that recognizes a requesting service that is a service requested by the user through communication with the user terminal; and
a candidate effector group determination unit that determines a combination of the plurality of effectors capable of executing the requesting service as a candidate effector group based on the requesting service and the service data of the service data storage unit,
wherein the communication unit transmits first data representing the candidate effector group to the user terminal,
wherein the user terminal comprises a terminal-side communication unit that receives the first data,
wherein an output interface that outputs the candidate effector group represented by the first data in an output mode recognized by the user when the terminal-side communication unit receives the first data,
wherein an input interface that selects one of the candidate effector groups that is output from the output interface by an operation of the user,
wherein the service data includes data of a functional specification representing a function of each of the effectors in the plurality of effectors and a characteristic specification representing a characteristic of each of the effectors,
wherein the output interface outputs the candidate effector group represented by the first data in the output mode including data of the functional specification and the characteristic specification of each of the candidate effector groups,
wherein the terminal-side communication unit of the user terminal transmits, when the one candidate effector group is selected by the input interface, second data representing the one candidate effector group to the control platform, the control platform further comprising:
- a schedule determination unit that determines an operation schedule of each of the effectors in the one candidate effector group in such a way that the one candidate effector group executes the service when the second data is received by the communication unit; and
- the communication unit transmits an operation schedule signal representing the operation schedule to each of the effectors in the one candidate effector group, and each of the plurality of effectors comprising
- an effector receiving unit that receives the operation schedule signal; and
- an operation executing unit that executes the predetermined operation according to the operation schedule when the operation schedule signal is received by the effector receiving unit.

2. A service providing method in which when a service is requested by a user via a user terminal, any one of a plurality of effectors is controlled via a control platform in which the plurality of effectors and the user terminal are communicably connected in a case where a combination of a plurality of effectors that execute different predetermined operations is one effector group to provide the service,
wherein
the plurality of effectors operate as: (i) a plurality of robots; (ii) devices communicably connected to the control platform to execute different predetermined operations; (iii) devices that execute at least one predetermined operation based on physical events including movement, excitation, driving, blowing, light emission, sound generation and odor generation; or (iv) a combination of a locking/unlocking device that automatically performs locking/unlocking and a light emitting device,
the service providing method comprising:
- storage step of storing, in the control platform, service data defining a relationship between each of the plurality of effector groups and any one of the plurality of services executable by each of the effector groups;
- determination step of determining, in the control platform, the combination of the plurality of effectors that can execute the service by referring to the service data according to the service when the service is requested by the user, as a candidate effector group;
- a first transmission step of transmitting first data representing the candidate effector group from the control platform to the user terminal;
- a first reception step of receiving the first data at the user terminal;
- an output step of outputting the candidate effector group represented by the first data to the user terminal in an output mode recognizable by the user when the first data is received; and
- a selection step of selecting one of the candidate effector groups by an operation of the user terminal by the user;
- a second transmission step of transmitting second data representing the one candidate effector group from the user terminal to the control platform when the one candidate effector group is selected by the operation of the user terminal;
- a second reception step of receiving the second data at the control platform;
- a determination step of determining, in the control platform, an operation schedule of each of the effectors in the one candidate effector group in such a way that the one candidate effector group executes the service when the second data is received;
- a third transmission step of transmitting an operation schedule signal representing the operation schedule from the control platform to each of the effectors in the one candidate effector group;
- a third reception step of receiving the operation schedule signal at each of the effectors; and
- an operation execution step of executing the predetermined operation in each of the effectors according to the operation schedule when the operation schedule signal is received.

3. The service providing method according to claim 2, wherein the service data includes data of a functional specification representing a function of each of the effectors in the plurality of effectors and a characteristic specification representing a characteristic of each of the effectors, and
in the output step, the candidate effector group represented by the first data is output to the user terminal in the output mode including data of the functional specification and the characteristic specification of each of the candidate effector groups.

* * * * *